(12) United States Patent
Maxwell et al.

(10) Patent No.: US 11,922,394 B2
(45) Date of Patent: Mar. 5, 2024

(54) CUSTOMER SEGMENT COMMUNICATIONS

(71) Applicant: Block, Inc., San Francisco, CA (US)

(72) Inventors: David W. Maxwell, San Francisco, CA (US); Tyler James Lettau, Hercules, CA (US); Tiffany Y. Ng, San Francisco, CA (US); Daniel G. Becker, San Francisco, CA (US); Lauren A. Myrick, San Francisco, CA (US)

(73) Assignee: Block, Inc., Oakland, CA (US)

( * ) Notice: Subject to any disclaimer, the term of this patent is extended or adjusted under 35 U.S.C. 154(b) by 50 days.

(21) Appl. No.: 17/467,174

(22) Filed: Sep. 3, 2021

(65) Prior Publication Data
US 2022/0058613 A1   Feb. 24, 2022

Related U.S. Application Data

(63) Continuation of application No. 16/875,964, filed on May 15, 2020, now Pat. No. 11,176,533, which is a
(Continued)

(51) Int. Cl.
| | |
|---|---|
| *G06Q 20/20* | (2012.01) |
| *G06Q 20/12* | (2012.01) |
| *G06Q 20/32* | (2012.01) |
| *G06Q 30/0207* | (2023.01) |
| *G06Q 30/0226* | (2023.01) |

(52) U.S. Cl.
CPC .......... *G06Q 20/209* (2013.01); *G06Q 20/12* (2013.01); *G06Q 20/202* (2013.01); *G06Q 20/3223* (2013.01); *G06Q 30/0207* (2013.01); *G06Q 30/0226* (2013.01); *G06Q 30/0239* (2013.01)

(58) Field of Classification Search
None
See application file for complete search history.

(56) References Cited

U.S. PATENT DOCUMENTS

| | | |
|---|---|---|
| D376,386 S | 12/1996 | Sisilli |
| 5,739,512 A | 4/1998 | Tognazzini |

(Continued)

FOREIGN PATENT DOCUMENTS

| | | |
|---|---|---|
| CA | 2 951 839 A1 | 9/2015 |
| WO | 2015/100378 A1 | 7/2015 |
| WO | 2015/138350 A1 | 9/2015 |

OTHER PUBLICATIONS

Notice of Allowance for Canadian Patent Application No. 2951839, dated May 2, 2022.
(Continued)

*Primary Examiner* — Scott A Zare
(74) *Attorney, Agent, or Firm* — Lee & Hayes P.C.

(57) ABSTRACT

Introduced here is a technology that enables a merchant to create customer-targeted, customized communications by use of a merchant platform executing on a financial service system. The merchant platform generates content for communications that is based on a particular customer segment. The customer segment includes one or more groups of customers segmented based on one or more attributes associated with each group of customers. An attribute is determined based on data collected by the financial service system, where the data is related to transaction data of a plurality of merchants.

20 Claims, 8 Drawing Sheets

Related U.S. Application Data continuation of application No. 15/900,753, filed on Feb. 20, 2018, now Pat. No. 10,692,064, which is a continuation of application No. 14/220,057, filed on Mar. 19, 2014, now abandoned.

(56) References Cited

U.S. PATENT DOCUMENTS

| | | | |
|---|---|---|---|
| 5,878,337 | A | 3/1999 | Joao et al. |
| 5,956,693 | A | 9/1999 | Geerlings |
| 7,085,812 | B1 | 8/2006 | Sherwood |
| D547,371 | S | 7/2007 | Miller |
| 7,415,492 | B2 | 8/2008 | Soliman |
| 7,764,185 | B1 | 7/2010 | Manz et al. |
| D621,872 | S | 8/2010 | Jordan |
| 7,783,515 | B1 | 8/2010 | Kumar et al. |
| 7,810,729 | B2 | 10/2010 | Morley, Jr. |
| D641,040 | S | 7/2011 | Tetrault |
| D657,414 | S | 4/2012 | Liu et al. |
| 8,180,682 | B2 | 5/2012 | Narayanaswami et al. |
| 8,224,700 | B2 | 7/2012 | Silver |
| 8,396,808 | B2 | 3/2013 | Greenspan |
| 8,534,551 | B2 | 9/2013 | Rothschild |
| 8,595,075 | B2 | 11/2013 | de Sylva |
| 8,892,462 | B1* | 11/2014 | Borovsky ............ G06Q 20/405 705/17 |
| 8,965,791 | B1 | 2/2015 | Bell et al. |
| 9,495,670 | B2 | 11/2016 | Bell et al. |
| 9,811,813 | B2 | 11/2017 | Laracey |
| D832,344 | S | 10/2018 | Bell |
| 2002/0188561 | A1 | 12/2002 | Schultz |
| 2003/0204447 | A1 | 10/2003 | Dalzell et al. |
| 2004/0030600 | A1 | 2/2004 | Lacroix |
| 2004/0054592 | A1 | 3/2004 | Hernblad |
| 2004/0158494 | A1 | 8/2004 | Suthar |
| 2004/0167820 | A1 | 8/2004 | Melick et al. |
| 2004/0225509 | A1 | 11/2004 | Andre |
| 2005/0071232 | A1 | 3/2005 | Frater |
| 2006/0143087 | A1 | 6/2006 | Tripp et al. |
| 2006/0261149 | A1 | 11/2006 | Raghavendra Tulluri |
| 2007/0045405 | A1 | 3/2007 | Rothschild |
| 2007/0050305 | A1 | 3/2007 | Klein |
| 2007/0069013 | A1 | 3/2007 | Seifert et al. |
| 2008/0040265 | A1 | 2/2008 | Rackley, III et al. |
| 2008/0065396 | A1 | 3/2008 | Marshall |
| 2008/0177624 | A9 | 7/2008 | Dohse |
| 2008/0197188 | A1 | 8/2008 | Jagatic et al. |
| 2009/0192898 | A1 | 7/2009 | Baril |
| 2009/0271265 | A1 | 10/2009 | Lay et al. |
| 2009/0292595 | A1 | 11/2009 | Tonnison et al. |
| 2009/0313132 | A1 | 12/2009 | McKenna et al. |
| 2010/0177343 | A1 | 7/2010 | Shapiro et al. |
| 2010/0217675 | A1 | 8/2010 | Bookstaff |
| 2010/0217699 | A1 | 8/2010 | Bookstaff |
| 2010/0269059 | A1 | 10/2010 | Othmer et al. |
| 2010/0325048 | A1 | 12/2010 | Carlson et al. |
| 2010/0332265 | A1 | 12/2010 | Smith |
| 2011/0106840 | A1 | 5/2011 | Barrett et al. |
| 2011/0178847 | A1* | 7/2011 | Rane .................. G06Q 30/02 705/7.31 |
| 2011/0184822 | A1 | 7/2011 | Matkovic |
| 2011/0264581 | A1 | 10/2011 | Clyne |
| 2012/0066065 | A1 | 3/2012 | Switzer |
| 2012/0084135 | A1 | 4/2012 | Nissan et al. |
| 2012/0226559 | A1* | 9/2012 | Baum .................. G06Q 30/02 705/14.66 |
| 2012/0290420 | A1 | 11/2012 | Close |
| 2013/0006782 | A1 | 1/2013 | Schwarzkopf et al. |
| 2013/0124262 | A1 | 5/2013 | Anchala |
| 2013/0132140 | A1 | 5/2013 | Amin et al. |
| 2013/0132246 | A1 | 5/2013 | Amin et al. |
| 2013/0132274 | A1 | 5/2013 | Henderson et al. |
| 2013/0132887 | A1 | 5/2013 | Amin et al. |
| 2013/0159446 | A1 | 6/2013 | Carlson et al. |
| 2013/0166332 | A1 | 6/2013 | Hammad |
| 2013/0198018 | A1 | 8/2013 | Baig |
| 2013/0225075 | A1 | 8/2013 | Schmid et al. |
| 2013/0238455 | A1 | 9/2013 | Laracey |
| 2013/0246207 | A1 | 9/2013 | Novak et al. |
| 2013/0246301 | A1 | 9/2013 | Radhakrishnan et al. |
| 2014/0052613 | A1 | 2/2014 | Tavakoli et al. |
| 2014/0100931 | A1 | 4/2014 | Sanchez et al. |
| 2014/0129135 | A1 | 5/2014 | Holden et al. |
| 2014/0129302 | A1 | 5/2014 | Amin et al. |
| 2014/0129441 | A1 | 5/2014 | Blanco et al. |
| 2014/0129951 | A1 | 5/2014 | Amin et al. |
| 2014/0180790 | A1 | 6/2014 | Boal |
| 2014/0180793 | A1 | 6/2014 | Boal |
| 2014/0297363 | A1* | 10/2014 | Vemana ............ G06Q 30/0269 705/7.29 |
| 2014/0337175 | A1 | 11/2014 | Katzin et al. |
| 2015/0120411 | A1* | 4/2015 | Kneen ................ G06Q 30/0211 705/14.13 |
| 2015/0149271 | A1 | 5/2015 | Battle et al. |
| 2015/0187021 | A1 | 7/2015 | Moring et al. |
| 2015/0220937 | A1 | 8/2015 | Iannace et al. |
| 2015/0254628 | A1 | 9/2015 | Bell et al. |
| 2016/0092895 | A1* | 3/2016 | Grossman .......... G06Q 30/0204 705/7.33 |
| 2017/0039540 | A1 | 2/2017 | Bell et al. |
| 2018/0181941 | A1 | 6/2018 | Maxwell et al. |
| 2019/0385142 | A1 | 12/2019 | Bell et al. |
| 2020/0258167 | A1 | 8/2020 | Moring et al. |
| 2020/0279241 | A1 | 9/2020 | Maxwell et al. |
| 2022/0301075 | A1 | 9/2022 | Moring et al. |

OTHER PUBLICATIONS

Updated Notice of Allowance dated Jan. 6, 2022, for U.S. Appl. No. 16/859,969, of Moring, D., et al., filed Apr. 27, 2020.
Notice of Allowance dated Feb. 7, 2020, for U.S. Appl. No. 15/900,753, of Maxwell, D.W., et al., filed Feb. 20, 2018.
Notice of Allowance dated Jun. 11, 2020, for U.S. Appl. No. 14/160,490, of Moring, D., et al., filed Jan. 21, 2014.
Non-Final Office Action dated Jun. 25, 2020, for U.S. Appl. No. 16/859,969, of Moring, D., et al., filed Apr. 27, 2020.
Final Office Action dated Jul. 10, 2020, for U.S. Appl. No. 16/452,474, of Bell B., et al., filed Jun. 25, 2019.
Non-Final Office Action dated Aug. 3, 2020, for U.S. Appl. No. 16/875,964, of Maxwell, D.W., et al., filed May 15, 2020.
Advisory Action dated Oct. 5, 2020, for U.S. Appl. No. 16/452,474, of Bell B., et al., filed Jun. 25, 2019.
Notice of Allowance dated Nov. 4, 2020, for U.S. Appl. No. 16/452,474, of Bell B., et al., filed Jun. 25, 2019.
Non-Final Office Action dated Nov. 24, 2020, for U.S. Appl. No. 16/875,964, of Maxwell, D.W., et al., filed May 15, 2020.
Final Office Action dated Mar. 25, 2021, for U.S. Appl. No. 16/875,964, of Maxwell, D.W., et al., filed May 15, 2020.
Final Office Action dated Apr. 6, 2021, for U.S. Appl. No. 16/859,969, of Moring, D., et al., filed Apr. 27, 2020.
Advisory Action dated May 14, 2021, for U.S. Appl. No. 16/875,964, of Maxwell, D.W., et al., filed May 15, 2020.
Advisory Action dated Jun. 8, 2021, for U.S. Appl. No. 16/859,969, of Moring, D., et al., filed Apr. 27, 2020.
Notice of Allowance dated Jun. 29, 2021, for U.S. Appl. No. 16/875,964, of Maxwell, D.W., et al., filed May 15, 2020.
Corrected Notice of Allowability dated Jul. 16, 2021, for U.S. Appl. No. 16/875,964, of Maxwell, D.W., et al., filed May 15, 2020.
Notice of Allowance dated Aug. 23, 2021, for U.S. Appl. No. 16/859,969, of Moring, D., et al., filed Apr. 27, 2020.
First Examination Report for Australian Patent Application No. 2015229659, dated Mar. 20, 2019.
Examination Report, for European Patent Application No. 15760811.8, dated Jun. 14, 2019.
Second Examination Report for Australian Patent Application No. 2015229659, dated Feb. 12, 2020.
First Examination Report for Australian Patent Application No. 2020202007, dated Dec. 8, 2020.

(56) References Cited

OTHER PUBLICATIONS

International Search Report and Written Opinion for International Application No. PCT/US2014/72269, dated Mar. 31, 2015.
International Search Report and Written Opinion for International Application No. PCT/US2015/019518, dated Jun. 18, 2015.
Extended European Search Report for European Patent Application No. 15760811.8, dated Jul. 14, 2017.
Third Examination Report for Australian Patent Application No. 2015229659, dated Mar. 20, 2020.
Examiner Requisition for Canadian Patent Application No. 2951839, dated Apr. 13, 2021.
Second Examination Report for Australian Patent Application No. 2020202007, dated May 12, 2021.
Notice of Acceptance for Australian Patent Application No. 2020202007, dated Jul. 30, 2021.
"Card Not Present Transaction," Wikipedia, published Mar. 4, 2014, Retrieved from the Internet URL: http://en.wikipedia.org/wiki/Card_not_present_transaction, on Jun. 6, 2014, pp. 1-2.
"Online Shopping," dated Nov. 2, 2014, Retrieved from the Internet URL: http://en.wikipedia.org/wiki/Online_shopping, on Nov. 10, 2014, pp. 1-12.
"Payment Gateway," Wikipedia, published May 30, 2014, Retrieved from the Internet URL: http://en.wikipedia.org/wiki/Pavment gateways, on Jun. 6, 2014, pp. 1-3.
"Uber—Android Apps on Google Play," Published on Nov. 10, 2014, Retrieved from the Internet URL: https://play.google.com/store/apps/details?id=com.ubercab&hl=en, on Nov. 12, 2014, pp. 1-2.
Goode, L., "Paying With Square's New Mobile-Payments App," All Things D, dated Apr. 30, 2012, Retrieved from the Internet URL: http://allthingsd.com/20120430/paying-with-squares-new-mobile-payments-app/, on Nov. 7, 2014, pp. 1-3.
Myres, L., "The Mac Security Blog: What is Multi-Factor Authentication, and How Will It Change in the Future?," Intego, dated Aug. 17, 2012, Retrieved from the Internet URL: http://www.intego.com/mac-security/blog/what-is-multi-factor-authentication-and-how-will-it-change-in-the-future/, on Nov. 11, 2014, pp. 1-4.
Wallen, J., "Five Top Apps for Managing Inventory," Tech Republic, dated Aug. 15, 2012, Retrieved from the Internet URL: http://www.techrepublic.com/blog/five-apps/five-top-apps-for-managing-inventory/, on Nov. 10, 2014, pp. 1-7.
Carr, A., "How Square Register's UI Guilts You Into Leaving Tips," dated Dec. 12, 2013, Retrieved from the Internet URL: http://www.fastcodesign.com/3022182/innovation-by-design/how-square-registers-ui-guilts-you-into-leaving-tips, on Jul. 1, 2015, pp. 1-12.
Munson, J., and Gupta, V.K., "Location-Based Notification as a General-Purpose Service," dated Sep. 28, 2002, Retrieved from the Internet URL—https://ai2-s2-pdfs.s3.amazonaws.com/1 bb5/6ae0a70b030e2f2376ed246834bddcabd27b.pdf, pp. 40-44.
Shalmanese, "The Straight Dope Message Board," message dated Oct. 5, 2013, Retrieved from the Internet URL: http://boards.straightdope.com/sdmb/showthread.php?t=703989%BB, on Jul. 18, 2016, pp. 1-10.
Non-Final Office Action dated Apr. 10, 2014, for U.S. Appl. No. 14/160,490, of Moring, D., et al., filed Jan. 21, 2014.
Non-Final Office Action dated Jun. 26, 2014, for U.S. Appl. No. 14/252,714, of Bell, B., et al., filed Apr. 14, 2014.
Non-Final Office Action dated Jul. 18, 2014, for U.S. Appl. No. 14/252,712, of Bell, B., et al., filed Apr. 14, 2014.
Final Office Action dated Aug. 28, 2014, for U.S. Appl. No. 14/160,490, of Moring, D., et al., filed Jan. 21, 2014.
Non-Final Office Action dated Oct. 1, 2014, for U.S. Appl. No. 14/252,714, of Bell, B., et al., filed Apr. 14, 2014.
Advisory Action dated Nov. 18, 2014, for U.S. Appl. No. 14/160,490, of Moring, D., et al., filed Jan. 21, 2014.
Non-Final Office Action dated Dec. 8, 2014, for U.S. Appl. No. 14/220,057, of Maxwell, D.W., et al., filed Mar. 19, 2014.
Notice of Allowance dated Jan. 5, 2015, for U.S. Appl. No. 14/252,714, of Bell, B., et al., filed Apr. 14, 2014.
EIC 3600 Search Report dated Jan. 5, 2015, for U.S. Appl. No. 14/252,714, of Bell, B., et al., filed Apr. 14, 2014.
Final Office Action dated Mar. 2, 2015, for U.S. Appl. No. 14/252,712, of Bell, B., et al., filed Apr. 14, 2014.
Non-Final Office Action dated May 5, 2015, for U.S. Appl. No. 14/220,057, of Maxwell, D.W., et al., filed Mar. 19, 2014.
Final Office Action dated Jun. 25, 2015, for U.S. Appl. No. 14/252,712, of Bell, B., et al., filed Apr. 14, 2014.
Non-Final Office Action dated Jul. 10, 2015, for Design U.S. Appl. No. 29/484,510, of Bell, B., filed Mar. 10, 2014.
Advisory Action dated Aug. 21, 2015, for U.S. Appl. No. 14/252,712, of Bell, B., et al., filed Apr. 14, 2014.
Final Office Action dated Oct. 14, 2015, for U.S. Appl. No. 14/220,057, of Maxwell, D.W., et al., filed Mar. 19, 2014.
Non-Final Office Action dated Jan. 14, 2016, for U.S. Appl. No. 14/252,712, of Bell, B., et al., filed Apr. 14, 2014.
Advisory Action dated Feb. 10, 2016, for U.S. Appl. No. 14/220,057, of Maxwell, D.W., et al., filed Mar. 19, 2014.
Non-Final Office Action dated May 9, 2016, for U.S. Appl. No. 14/220,057, of Maxwell, D.W., et al., filed Mar. 19, 2014.
Final Office Action dated Jun. 7, 2016, for Design U.S. Appl. No. 29/484,510, of Bell, B., filed Mar. 10, 2014.
Non-Final Office Action dated Jun. 13, 2016, for U.S. Appl. No. 14/252,716, of Bell, B., et al., filed Apr. 14, 2014.
Non-Final Office Action dated Jul. 14, 2016, for U.S. Appl. No. 14/160,490, of Moring, D., et al., filed Jan. 21, 2014.
Notice of Allowance dated Jul. 21, 2016, for U.S. Appl. No. 14/252,712, of Bell, B., et al., filed Apr. 14, 2014.
Final Office Action dated Oct. 26, 2016, for U.S. Appl. No. 14/220,057, of Maxwell, D.W., et al., filed Mar. 19, 2014.
Final Office Action dated Nov. 1, 2016, for U.S. Appl. No. 14/160,490, of Moring, D., et al., filed Jan. 21, 2014.
Ex Parte Quayle Action mailed Dec. 20, 2016, for Design U.S. Appl. No. 29/484,510, of Bell, B., filed Mar. 10, 2014.
Advisory Action dated Jan. 26, 2017, for U.S. Appl. No. 14/220,057, of Maxwell, D.W., et al., filed Mar. 19, 2014.
Notice of Allowance dated Mar. 16, 2017, for Design U.S. Appl. No. 29/484,510, of Bell, B., filed Mar. 10, 2014.
Non-Final Office Action dated Apr. 18, 2017, for U.S. Appl. No. 14/160,490, of Moring, D., et al., filed Jan. 21, 2014.
Non-Final Office Action dated May 15, 2017, for U.S. Appl. No. 14/220,057, of Maxwell, D.W., et al., filed Mar. 19, 2014.
Final Office Action dated Aug. 10, 2017, for U.S. Appl. No. 14/160,490, of Moring, D., et al., filed Jan. 21, 2014.
Non-Final Office Action dated Aug. 14, 2017, for Design U.S. Appl. No. 29/484,510, of Bell, B., filed Mar. 10, 2014.
Final Office Action dated Oct. 11, 2017, for U.S. Appl. No. 14/220,057, of Maxwell, D.W., et al., filed Mar. 19, 2014.
Advisory Action dated Oct. 31, 2017, for U.S. Appl. No. 14/160,490, of Moring, D., et al., filed Jan. 21, 2014.
Non-Final Office Action dated Dec. 19, 2017, for Design U.S. Appl. No. 29/484,510, of Bell, B., filed Mar. 10, 2014.
Non-Final Office Action dated Mar. 26, 2018, for U.S. Appl. No. 15/331,594, of Bell, B., et al., filed Oct. 21, 2016.
Notice of Allowance dated Jun. 29, 2018, for Design U.S. Appl. No. 29/484,510, of Bell, B., filed Mar. 10, 2014.
Notice of Allowance dated Jul. 31, 2018, for Design U.S. Appl. No. 29/484,510, of Bell, B., filed Mar. 10, 2014.
Final Office Action dated Nov. 16, 2018, for U.S. Appl. No. 15/331,594, of Bell, B., et al., filed Oct. 21, 2016.
Notice of Allowance dated Mar. 13, 2019, for U.S. Appl. No. 15/331,594, of Bell, B., et al., filed Oct. 21, 2016.
Non-Final Office Action dated Jan. 10, 2020, for U.S. Appl. No. 16/452,474, of Bell, B., filed Jun. 25, 2019.
Notice of Grant for Australian Patent Application No. 2020202007, dated Nov. 25, 2021.
Notice of Allowance dated Dec. 15, 2021, for U.S. Appl. No. 16/859,969, of Moring, D., et al., filed Apr. 27, 2020.
Notice of Allowability dated Mar. 10, 2020, for U.S. Appl. No. 14/160,490, of Moring, D., et al., filed Jan. 21, 2014.

* cited by examiner

CUSTOMER SEGMENT COMMUNICATIONS

RELATED APPLICATIONS

This application claims priority to and is a continuation of U.S. patent application Ser. No. 16/875,964, filed May 15, 2020, which is a continuation of U.S. patent application Ser. No. 15/900,753, filed Feb. 20, 2018, and issued Jun. 23, 2020 as U.S. Pat. No. 10,692,064, which is a continuation of U.S. patent application Ser. No. 14/220,057, filed on Mar. 13, 2014, and abandoned May 3, 2018, the entire contents of which are incorporated herein by reference.

BACKGROUND

The traditional manner of providing content on receipts to assist merchants in improving their businesses is limited and ineffective. For example, a receipt for a payment transaction typically includes content (e.g., an advertisement and/or a coupon) that focuses on the products and/or services offered by that merchant, and nothing more. The content is often based on limited transaction information collected by one data source (e.g., the merchant's point-of-sale (POS) system). Moreover, the merchant has little control over what is being placed on the receipt, as third-party receipt services often generate the content on the merchant's behalf according to a standardized format. Accordingly, it is often difficult for merchants to cater to different customers and to improve their businesses under the traditional model.

BRIEF DESCRIPTION OF THE DRAWINGS

Embodiments of the disclosed technology will be described and explained through the use of the accompanying drawings in which.

DETAILED DESCRIPTION

Figure 1:
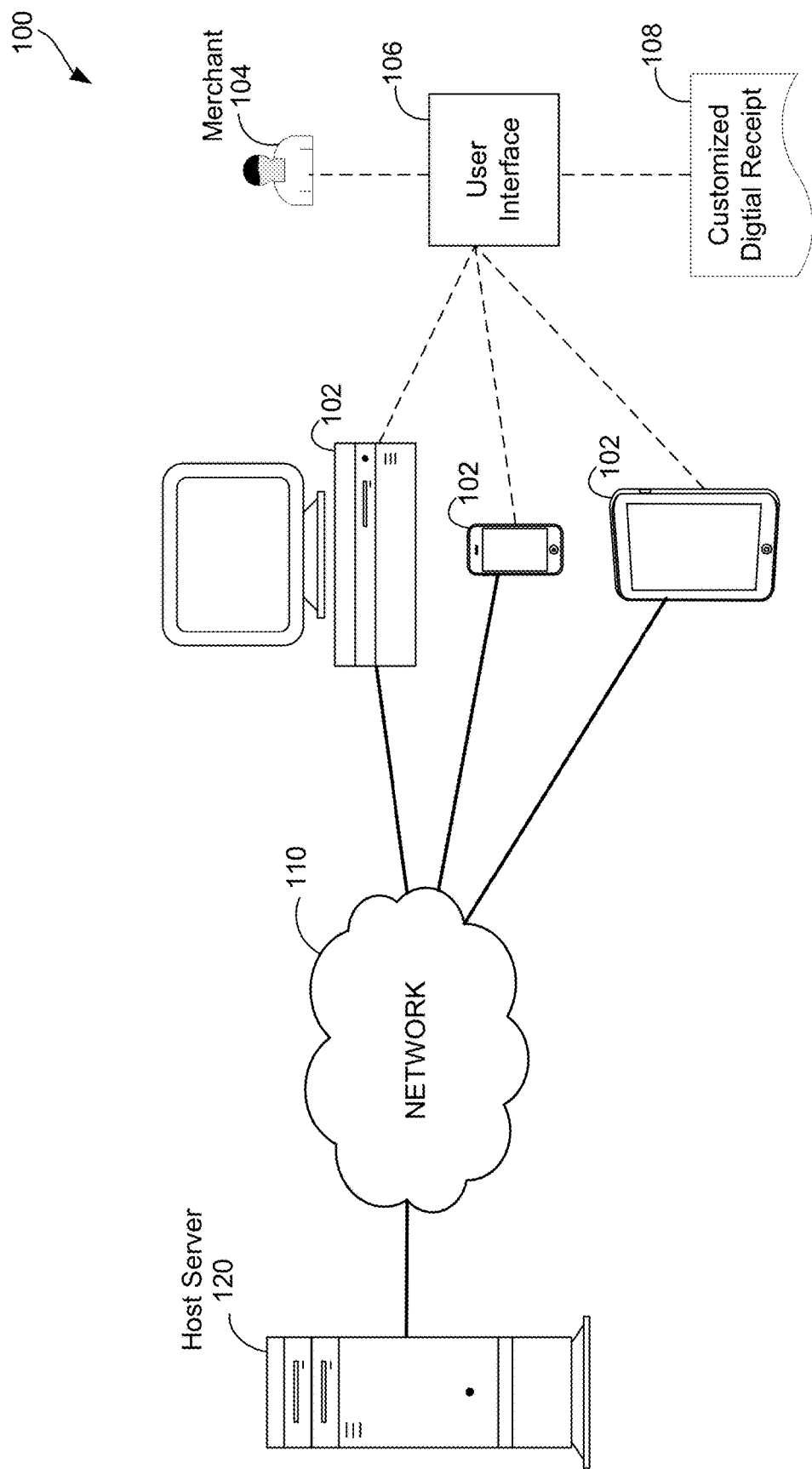
FIG. 1 is a representative computer network environment in which the merchant platform technology can be implemented.

In this description, references to "an embodiment", "one embodiment," or the like, mean that the particular feature, function, structure, or characteristic being described is included in at least one embodiment of the technique introduced here. Occurrences of such phrases in this description do not necessarily all refer to the same embodiment. On the other hand, the embodiments referred to also are not necessarily mutually exclusive.

Introduced here is a technology that enables creation of more effective customized receipts by use of a merchant platform. The merchant platform can be executing on a payment service system. The merchant platform assists a merchant in customizing a digital receipt template by incorporating one or more feature programs into the template to target the needs and interests of a customer, or group of customers. The merchant platform can generate the one or more feature programs based on analytics associated with customer segmentation. The one or more feature programs can be, for example, a feedback feature program, a loyalty reward feature program, a promotion feature program, and/or a tipping feature program, where each feature program is generated based on customer segmentation.

The technology is particularly advantageous when applied to electronic, or digital, receipts that deliver electronic content to customers after completion of a transaction. As used throughout the description, the term "digital receipt" refers to an electronic transaction record that can be in the form of, for example, a mobile receipt application, a text message, an e-mail, a customer online account with a merchant website, or the like. In particular, the technology enables the merchant control over content that is included in the digital receipts received by the customers. The content (i.e., one or more feature programs) is customized based on customer segmentation, and as such the content tailors to particular interests and/or needs associated with the customers. By delivering the digital receipts with the customized content, the merchant can incentivize certain behaviors in the customers (e.g., revisit the merchant's business, purchase a new product, etc.). Moreover, the customized content is generated based on data collected from multiple data sources, including information about attributes of the merchant's customers in addition to attributes of other related merchants' customers. Accordingly, the technology provides intelligent information that can help the merchant effectively cater to different customers and improve various aspects of the merchant's business.

In at least some embodiments of the disclosed technology, the merchant platform analyzes financial transaction data to provide the customer segmentation analytics for generating the various feature programs. The financial transaction data can come from various sources, such as the merchant's point-of-sale (POS) system, public and private databases, the digital receipts themselves, or the like. The merchant platform utilizes the customer segmentation analytics to provide various feedback, loyalty, promotion, and/or tipping feature programs to the merchant as recommended content for incorporation into a digital receipt template. In particular, a digital receipt template contains one or more feature programs based on a particular customer segmentation. A customer that has certain criteria fitting the attributes of the particular customer segmentation would receive a digital receipt generated based on the digital receipt template.

The following example is an illustrative use case that is beneficial for explaining the various aspects of the technology introduced here. In the example, a user (e.g., a merchant) utilizes a merchant platform to create a digital receipt template that target a particular customer or group of customers based on a customer segmentation. Note that the term "user" as used throughout the specification may refer to a merchant in some, but not all, instances, as will be apparent from context; that is, not all terms that include the term "user" refer to the merchant. For example, the term "user interface" as used here does not necessarily refer to an interface used by a merchant; a user interface can refer, for example, to an interface used by a customer. Note, also, the term "merchant" as used here generally refers to a provider of goods and/or services and/or a receiver of payment for such goods and/or services, such as a retailer, a seller, or a payee. Such terms "merchant," "retailer," "seller," or "payee" are used interchangeably throughout the description without any intended change in meaning. Further, the term "customer" generally refers to a consumer, a buyer, or a payer (as opposed to a merchant/retailer/seller/payee).

Additionally, the technology introduced here is not limited in applicability to any particular type of business. The technology can be employed with any transaction that traditionally would be initiated by, or involve the use of, a financial account. Hence, the term "transaction" refers to any type of payment-oriented transaction, including, for example, a lease or a rental, and is not limited to an actual purchase. Similarly, the term "sale," such as in "point-of-sale" (POS), refers to any type of payment-oriented transaction, and is not limited to an actual purchase.

In the illustrative use case, the user (hereinafter, "merchant") uses a computing device to access the merchant platform. The computing device can be any electronic device with communication and processing capabilities, such as a mobile device (e.g., tablet computer) or a personal computer (e.g., desktop computer). The merchant platform can be an application that runs on the merchant's computing device (e.g., a mobile merchant application) or is accessed by an application operating on the merchant's device (e.g., a merchant portal accessible via a web browser application). The merchant platform enables the merchant to create a customized digital receipt template by incorporating a feedback feature program, a loyalty reward feature program, a promotion feature program, and/or a tipping feature program to a digital receipt that would be sent out to customers of the merchant.

Using the merchant platform, the merchant begins looking at various feature programs generated by the merchant platform. The merchant platform generates the various feature programs based on a customer segmentation, or segment, in which the merchant's targeted customers belongs. A customer segmentation can be based on various attributes associated with the targeted customers. The merchant platform can adapt the feature programs based on the customer segmentation; that is, each feature program can be generated to target a different segment, or group, of customers based on the various attributes associated with the group of customers.

The attributes for the customer segmentation can be derived from (a) data collected about the merchant (and the merchant's customers) and/or (b) data collected about other merchants related to the merchant (and those merchants' customers). Related merchants can include merchants that are similarly situated as the merchant or merchants that are similarly located as the merchant. Hence, the merchant is not limited to data collected only by the merchant's point-of-sale (POS) system. Through the merchant platform, the merchant is able to enjoy the benefit of having access to intelligent information on how other merchants conduct business.

The term "similarly situated merchant" refers generally to a merchant that conducts business in a similar way as another merchant, such as selling a similar product or providing a similar service. For example, Coffee Shop X is a similarly situated merchant as Coffee Shop Y because both sell coffee, where their customers share a similar interest in coffee beans. In another example, Retailer X, which is a high-end clothing store, is a similarly situated merchant as Retailer Y, which is a high-end designer shoe store, where both cater to the same type of customers sharing a similar taste in high-end goods. The term "similarly located merchant" refers generally to a merchant that is geographically located within an approximate distance or area with respect to another merchant. For example, Merchant X and Merchant Y are similarly located merchants because they both have businesses located within downtown Palo Alto, where both cater to customers that frequent downtown businesses.

The attributes can be based on a customer response rate, a visit frequency, a geographic location, an age range, an income range, a spending trend based on the customer purchase history (e.g., whether customers have shopped or regularly shop in an area or with particular merchants), or a "newness" of a customer in relation to the merchant's business (e.g., whether the customer is a new customer or a returning customer). The attributes can also be based on customers being associated with a particular merchant that is similarly situated or similarly located to the merchant. That is, a group of customers can be segmented based on whether the customers within the group are customers of similarly situated merchants or are customers of similarly located merchants.

The merchant first looks at feedback programs generated for a "new customer" segment, a "returning customer" segment, and a "general customer" segment (i.e., all customers), where the customer segments are based on a new customer attribute (i.e., whether customers in the segment are new to a merchant's business). The feedback program for new customers can include questions, for example, about a customer's reason for visiting the merchant's business for the first time. On the other hand, a feedback program for returning customers can include, for example, questions about a customer's opinion of a new change to the merchant's business. The various feature programs can include, in another example, a promotion program recommended for new customers (e.g., "Receive a free item on your next visit within the week.").

The merchant next looks at loyalty reward programs and promotion programs generated by the merchant platform for a "new customer" segment, a "returning customer" segment, and a "general customer" segment (i.e., all customers). For example, the merchant platform presents several "Free" promotional coupon programs tailored to new customers, where a "Free Item" coupon generally performs well for the new customer segment. In another example, where the merchant is a high-end clothing store, the merchant platform presents a different promotion program that gives the customer "20% Off" for a next purchase, where such coupon has performed well in relation to similarly situated high-end clothing merchants. In yet another example, where the merchant is a coffee shop, the merchant platform recommends a loyalty reward program (instead of a promotion program) that gives the customer a free coffee on the fifth purchase, where such loyalty reward program has performed well for similarly situated coffee shop merchants.

The merchant next looks at various tipping programs generated by the merchant platform. Similar to the other features, the platform can generate tipping programs based on customer segmentation. For example, where the merchant is a restaurant, the merchant platform presents a tipping program. On the other hand, where the merchant is a wholesale goods supplier, the merchant platform does not present a tipping program, but instead presents a promotion program with various incentives for customers of the supplier.

The merchant can adapt the specific content of the tipping programs based on the customer segmentation. In particular, the merchant platform presents various tipping scales for different tipping programs. For example, for a food truck merchant with transactions generally under $10, the merchant platform presents default tip amounts of $1, $2, and $3. For a restaurant merchant, however, the merchant platform presents default tip amounts of 15%, 18%, and 22%. The merchant platform can also analyze data associated with tipping histories, products and/or services of various transactions with a particular customer in generating the tipping programs based on customer segmentation. For example, for a group of customers who typically tip too low, the platform recommends a default percentage amount (e.g., 15% tip) to be added to the receipt.

After the merchant has finished incorporating various feature programs into the customized digital receipt template, the merchant can save the template. At a later time, whenever a customer of the merchant conducts a transaction, a digital receipt based on the customized digital receipt template is transmitted to the customer (e.g., via the customer's mobile device). The digital receipt received by the customer would include general information about the transaction (e.g., items purchased, prices, date, total amount, etc.), in addition to customized content of one of more feature programs incorporated into the digital receipt based on the customized digital receipt template.

Other aspects and advantages of the disclosed technology will become apparent from the following description in combination with the accompanying drawings, illustrating, by way of example, the principles of the disclosed technology.

FIG. 1 is a representative computer network environment 100 within which the disclosed technology can be implemented, according to various embodiments. One of ordinary skill in the art will understand that the components of FIG. 1 are just one implementation of the computer network environment 100 within which present embodiments can be implemented, and the various alternative embodiments are within the scope of the present embodiments. The environment 100 includes a client device 102 of a merchant user 104 (also referred to as "merchant"), a network 110, and a host server 120. The client device 102 and the host server 120 are coupled in communication for data transmission over the network 110, which can be or include the Internet and one or more wired or wireless networks (e.g., a local area network (LAN), a wireless local area network (WLAN), a cellular telecommunications network, etc.).

The host server 120 can be one or more server computer systems or work stations employed by a payment service organization (hereinafter, a "payment service system") for hosting a platform for merchants (hereinafter, "merchant platform"), where the merchant platform functions as a portal for the merchant 104 to create a customized digital receipt template with content customized to customers of the merchant based on customer segmentation. The content can include, or be a part of, a feedback feature, a loyalty reward feature, a promotion feature, or a tipping feature. The merchant platform can reside on the client device 102, on a server (e.g., server 120 hosting, for example, a website having the platform), or can be distributed between the client device 102 and the server 120. It is noted that while the server 120 is illustrated in FIG. 1 as a separate entity from the client device 102, in some embodiments, both the client device 102 and the server 120 can be implemented in the same computing device, such as a smart phone or a tablet computer, with a mobile application downloaded from the server 120 and installed on the device. In such embodiments, the standalone computing device can be the sole host of the environment 100 and can practice the various methodologies disclosed here.

The merchant 104 can use the client device 102 to access the platform provided by the payment service system 120. The client device 102 can be, for example, a laptop computer, a desktop computer, a tablet computer, an e-reader, a smart phone, a personal digital assistant ("PDA"), a hand held console, or any other form of processing device. The client 102 typically includes a display that can be used to display a user interface 106. Through the user interface 106, the system 120 can communicate with the merchant by way of the merchant platform to present customer segmentation analytics that can assist the merchant 104 in the feedback program creation process. The client device 102 can include suitable input devices (not shown for simplicity) to receive criteria inputs from the merchant 104. The criteria inputs can be, for example, related to a segment of customers from whom the merchant desires to elicit feedback. The input devices can include, for example, a keyboard, a mouse, a touchpad, etc. In some embodiments, the display of the client device 102 can be a touch-sensitive screen that includes input functionalities.

The payment service system 120 of the environment 100 illustrated in FIG. 1 can facilitate the creation, or generation, of one or more customized digital receipt templates for implementing a digital receipt 108 customized to address intelligently the needs and interests of specific customers (also referred to as "consumers") of the merchant 104. A digital receipt 108 created based on a customized digital receipt template (hereinafter, "receipt template") can be beneficial for a merchant in incentivizing certain behaviors of the merchant's customers. For example, a customer can become a loyal customer with a particular merchant due to a positive experience with a particular promotion delivered to the customer via the digital receipt 108.

In some embodiments, the merchant platform executing on the payment service system 120 allows the merchant to create the feedback program 108 by providing customer segmentation analytics. The customer segmentation analytics indicate which particular feature programs are more impactful for tailoring to a particular customer segmentation. The feature programs are associated with a feedback feature, a loyalty reward feature, a promotion feature, and/or a tipping feature, where the merchant can select one or more of the features to incorporate in the receipt template for generating a customized digital receipt 108.

The term "customer segmentation" as used here generally refers to a division of customers into groups, or segments, based on various attributes shared by the customers in each segment. The attributes can be based on a type of customer (i.e., whether the customer is a new customer or a returning customer), a frequency of visit of the customer to a merchant's place of business, a geographical location of the customer (e.g., visitor or a local resident), an age range, an income range, a spending trend, whether the customer is a customer of a merchant that is similarly situated to another merchant, or whether the customer is a customer of a merchant that is similarly located to another merchant.

Based on a particular customer segmentation, a feature program is generated to include content tailored to customers of the customer segmentation. In one example, the platform provides the merchant a feedback program with questions tailored to new customers and a feedback program tailored to returning customers for a merchant that wants to add a feedback feature to the receipts for the merchant's customers. In another example, the platform provides several "% Off" promotion programs to a high-end clothing merchant, and alternatively provides several "Buy X, get 1 free" loyalty programs for a coffee shop merchant according to the merchants' respective lines of business.

The merchant platform executing on the payment service system 120 can determine a particular customer segmentation by analyzing various attributes based on data about a particular merchant, data about merchants related to the particular merchant, data about merchants in general, or a combination thereof. The merchants related to the merchants can be similarly situated merchants or similarly located merchants. The term "similarly situated merchant" refers to a merchant that conducts business in a similar way as another merchant, such as selling a similar product or providing a similar service. For example, Coffee Shop X is a similarly situated merchant as Coffee Shop Y because both sell coffee, where their customers share a similar interest in coffee beans. The term "similarly located merchant" refers to a merchant that conducts business at a geographical location that is within an approximate distance or a geographical area as the business location of another merchant. For example, Merchant X and Merchant Y are similarly located merchants because they both have businesses located within downtown Palo Alto, where both cater to customers that frequent downtown businesses.

In various embodiments, the data discussed above, from which the attributes are derived, can include information collected through digital receipts, from point-of-sale (POS) systems (e.g., data from track 1, track 2, and/or track 3 of a credit card's magnetic stripe), or from databases maintained by public and/or private entities. In some embodiments, the data can be collected by the system 120 from past transactions conducted by a particular merchant, by similarly situated merchants associated with the particular merchant, or by similarly located merchants associated with the particular merchant.

In various embodiments, the system 120 can analyze the data to derive various attributes. The various attributes can include a type of customer attribute (e.g., a new customer), a frequency of visit attribute, a geographical location attribute (e.g., a local resident, a visitor, etc.), an age range attribute, an income range attribute, a spending trend attribute, among others. The attributes can also include customer response rates. The term "customer response rate" generally refers to a rate of response of a customer to a feature offered on a digital receipt. The response can be an interaction with the feature, such as opening or accessing content of that feature, upon receiving the feature on the digital receipt. An analysis of the customer response rates can provide insights on the effectiveness of incorporating certain feature programs into the digital receipt 108.

The attributes associated with customer segmentation can be extracted or inferred from transactions generally conducted between merchants and customers. For example, an analysis of a customer' purchase history can reveal the customer's spending trends and assist in placing the customer in a particular segment (e.g., generous spender with a high disposable income, customer interested in high-end electronic goods, etc.). In another example, analysis of transaction data (e.g., zip code and location of purchases extracted from a credit card's magnetic stripe) can reveal whether the customer is a local customer or an out-of-town customer. In such example, the data can be used to place the customer in a group and analyze specific spending trends of customers in that group (e.g., local customers enjoy restaurants with organic offerings). In another example, an analysis of the data can reveal what types of merchants frequently visited by residents of a particular geographic area. In another example, the analysis can infer information indicative of a popularity of certain products bought by a particular age group.

As discussed above customer segmentation refers generally to a division of customers into segments based on various attributes. For example, the platform executing on the payment service system 120 can present to the merchant 104 several feedback programs with different questionnaires targeting new customers, returning customers, or general customers (i.e., all customers no distinctions), where the questionnaires are recommended based on their performance with the respective customer segments. It is noted that performance may be based on effectiveness with respect to the merchant's own customers or other related merchants' customers. Further, the performance can be based on data associated with past transactions and/or current transactions. In another example, a customer segmentation can include an "age 18 and under" segment, an "age 18 to 30" segment, and an "age 30 and up" segment. The merchant platform can utilize the customer segmentation attributes individually or in combinations. For example, the merchant platform can recommend a particular feedback program that targets returning customers in the 18 to 30 years old age group.

Figure 2:
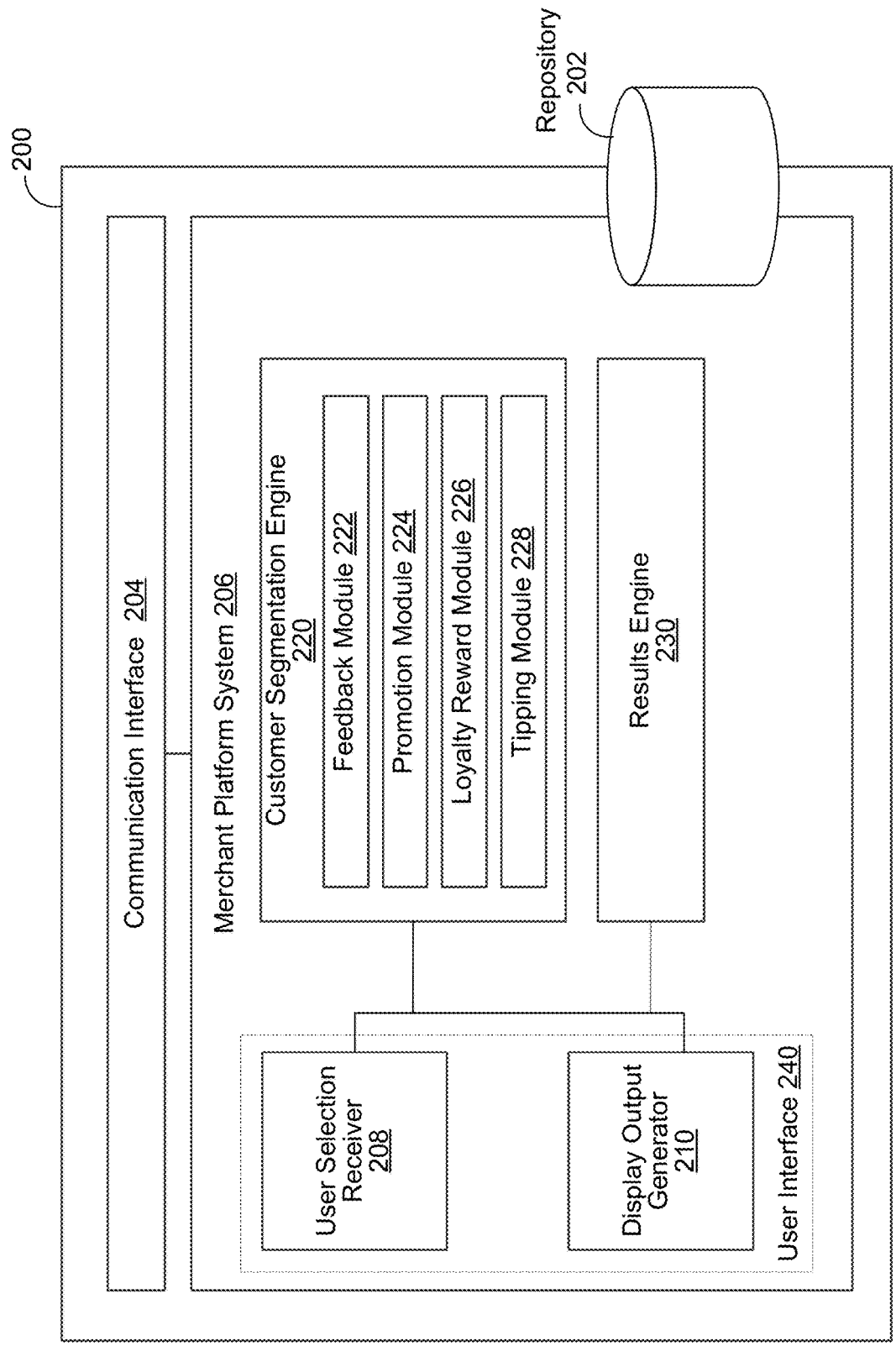
FIG. 2 is a representative subset of components of a merchant platform executing on a computer server system.

FIG. 2 is a block diagram of a subset of components of a merchant platform executing on a computer server system 200, in accordance with various embodiments. The computer server system 200 can be the server 120 of FIG. 1. The computer server system 200 can be utilized by a financial service organization, such as a payment service company, to implement the merchant platform discussed above. The computer server system 200 (hereinafter, "payment service system" or "financial service system") includes a repository 202, a communication interface 204, and a merchant platform 206. One or more embodiments of the merchant platform 206 can include a user selection receiver 208, a display output generator 210, a customer segmentation engine 220, and a results engine 230. In implementing the methodologies disclosed here, the customer segmentation engine 220 can include a feedback module 222, a promotion module 224, a loyalty reward module 226, and a tipping module 228.

The repository 202 is typically coupled to a server (e.g., server 120 of FIG. 1) for storing data associated with various processing functionalities carried out by the server. The repository can include, for example, one or more hard drives, a centralized or distributed data cluster, a cloud-storage service provider, or other suitable storage systems suitable for storing data. The repository can be used for storing data associated with financial transactions (e.g., customer identification information, purchase information, merchant information, etc.), data associated with an analysis of financial transaction data (e.g., customer segmentation analytics), and/or data associated with creating feedback programs, promotion programs, or loyalty programs.

In some embodiments, the data associated with financial transactions stored by the repository 202 can be collected by the payment service system 200. The payment service system 200 can collect the data from a payment card utilized in a financial transaction. For example, when a credit card is swiped through a card reader of a merchant's point-of-sale (POS) system, the POS system receives the data stored on track 1, track 2, and/or track 3 of the credit card's magnetic stripe, and passes such data to the payment service system 200, which stores the data in the repository 202. In such an example, the merchant can be a merchant that has an account with a payment service organization which employs the payment service system 200, where the merchant's POS system is in communication with the payment service system 200.

The payment service system 200 can also collect the data from inputs submitted by a consumer who has an account with the payment service organization. For example, a consumer signs up for an account with the payment service organization, where the sign-up process requires user submission of certain information to execute a financial transaction using the account. The information includes, for example, a credit card number, an email, a photograph of the consumer, a date of birth, and/or other personal identifying information.

After creating an account, the consumer can select a merchant that also has an account with the payment service organization. In such instance, the consumer can use the account with the payment service organization to conduct financial transactions with the merchant who also has an account. The financial transactions can be card-based transactions (e.g., physical swiping of a payment card at a merchant's POS system) or cardless-based transactions (e.g., online through a merchant's website). In a cardless-based transaction, the merchant need not receive any details about the consumer's financial account, e.g., the credit card issuer, credit card number, and the like. In such instance, the payment service system internally processes the transaction on behalf of the merchant using the consumer's account and the merchant's account with the payment service organization.

In some embodiments, other systems that do not process payment transactions can also generate and collect the data stored in the repository 202. Other systems can obtain such data, for example, from their own records of purchase transactions. For example, a merchant's POS system itself collects and stores the data utilized by the merchant platform. In another example, a public repository system collects publically available information associated with various financial transactions. In yet another example, a company collects information in a privately held repository and sells such information at a premium. An example is a social networking company that offers social graph information.

The user selection receiver module 208 can detect or receive a selection of a user (e.g., a merchant) from a user's device (e.g., client 102 of FIG. 1) via an input device coupled to the device, such as a mouse, a keyboard, a touchscreen, a gesture capturing device, a microphone, or the like. The receiver 208 is coupled to the customer segmentation engine 220 in communicating the user's selection. For example, the user selection receiver module 208 can detect input submission from a merchant using an iPad to select one or more feature programs for incorporating into a receipt template for a digital receipt that gets sent out to customers.

The display output generator module 210 can generate, adjust, modify, replace, or edit the content being displayed to a user, for example, via a user interface (e.g., interface 106 as displayed on the client 102). For example, the display output generator module 210 can include program codes that generate or adjust data using HyperText Markup Language (HTML), Extensible Markup Language (XML), JavaScript Object Notation (JSON), JavaScript and XML (AJAX), and/or other forms and formatting or style information (e.g., Cascading Style Sheets (CSS)) to display or adjust the content on the screen of the client 102. The content can include, for example, a feedback program having a questionnaire for topic X and a promotion program associated with topic X. The content can include, for example, a feedback program having a questionnaire for topic X and a promotion program associated with topic X, where the programs are incorporated into a receipt template.

The communication interface 204 can be a networking module that enables the system 200 to mediate data in a network with an entity that is external to the system 200, through any known and/or convenient communications protocol supported by the host and the external entity. The communication interface 204 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.), Bluetooth, a router, an access point, a wireless router, a switch, a multilayer switch, a protocol converter, a gateway, a bridge, bridge router, a hub, a digital media receiver, and/or a repeater.

The customer segmentation engine 220 analyzes data stored in the repository 202 to generate analytics for use by the merchant platform 206 in creating customized content associated with one or more programs for the merchant (e.g., feedback program, promotion program, loyalty reward program, or tipping program). The analytics include statistics associated with customer segmentation. A customer segmentation is a group of customers segmented based on one or more attributes. In particular, the customer segmentation analytics provide organized, intelligent information based on an analysis of various attributes associated with customers of a particular merchant and/or other related merchants. The various attributes can be attributes shared by customers of merchants that provide similar products and/or services, or customers of merchants that share a similar geographical location for their places of business. The various attributes can also be attributes shared by customers based on whether the customers are new customers or returning customers (i.e., type of customer), a frequency of visit, a geographical location (e.g., residence, work location, hang-out location, visiting, etc.), an age range, an income range, or a spending trend.

The merchant platform 206 presents analytics generated by the customer segmentation engine 220 in association with various feedback programs, loyalty reward programs, promotion programs, tipping programs, or the like, that can be included as content incorporated into digital receipts delivered to customers. The customer segmentation analytics provide an indication of which type of feature programs (e.g., feedback, loyalty reward, promotion, tipping, or combination thereof), and more particularly which particular program(s) (e.g., feedback program 1 or feedback program 2), are more impactful for targeting certain customers of the merchant (i.e., a group of customers sharing particular attributes). The feedback module 222, the loyalty reward module 224, the promotion module 226, and the tipping module 228 can generate the various programs based on customer segmentation using the analytics generated by the customer segmentation engine 220.

The feedback module 222 works in coordination with the customer segmentation engine 220 to generate feedback programs for the merchant platform 206. The feedback programs are displayed using, for example, the display output generator 210 to enable selection by the merchant for sending out to customers based on the customer segmentation. A feedback program can include feedback questions and feedback parameters which define the questions based on the customer segmentation analytics generated by the customer segmentation engine 220. In particular, the feedback module 222 can adapt the questions contained in each feedback program to be more effective based on the customer segmentation (as specified in the parameters).

The parameters can include a specificity (or intensity) of the questions eliciting feedback from customers, an order of the questions, a timing of the questions (i.e., when to send the questions), where each of the parameter is based on the customer segmentation. For example, for loyal customers (i.e., customers that return to the merchant's store frequently), the timing of the questions is set to be monthly. That is, a feedback questionnaire will not be sent to a particular loyal customer every time the customer visits the merchant's store, as this would be a nuisance since the customer makes a purchase daily. Further, in the example, the questions for the loyal customer can include specific questions eliciting detailed feedback about the merchant's store, as opposed to general questions. In another example, for a segment of out-of-town customers (e.g., visitors), the feedback module 222 generates a feedback program with questions regarding a comparison between the store visited and other stores in the customer's hometown.

The promotion module 224 works in coordination with the customer segmentation engine 220 to generate promotion programs for the merchant platform 206. In some embodiments, the promotion module 224 works in coordination with the feedback module 226. In such embodiments, the promotion module 224 generates one or more promotion programs in response to feedback results received from customers. The display output generator 210 can present the promotion programs generated by the promotion module 224, for example, on a display of a merchant device to enable selection by the merchant to send out to customers.

A promotion program can include a promotion (e.g., a coupon) and promotion parameters that define the promotion. The promotion parameters are based on the customer segmentation analytics generated by the customer segmentation engine 220. In particular, the promotion module 224 can adapt the content contained in each promotion (e.g., a coupon) to be most effective for a particular customer segmentation. For example, for a segment of high-spending customers, the promotion module 222 generates a promotion program that rewards the customer 25% off for spending $500 in one visit. In another example, for a segment of department store merchants, the promotion module 222 generates a promotion program that gives $10 for a $30 purchase.

The loyalty reward module 226 works in coordination with the customer segmentation engine 220 to generate loyalty reward programs for the merchant platform 206. In some embodiments, the loyalty reward module 226 works in coordination with the feedback module 226. In such embodiments, the loyalty reward module 226 generates one or more loyalty reward programs in response to feedback results received from customers. The display output generator 210 can present the loyalty reward programs generated by the loyalty reward module 226, for example, on a display of a merchant device to enable selection by the merchant to send out to customers.

A loyalty reward program can include a loyalty reward (e.g., a "Buy 4, get 5th Free" digital punch card) and loyalty reward parameters that define the loyalty reward. A loyalty reward typically gives a customer points for purchases and/or services conducted, where the points can be redeemed for a reward, such as a free purchase, that can be used at the merchant's store or an affiliated merchant's store. The loyalty reward parameters defining a particular loyalty reward are based on the customer segmentation analytics generated by the customer segmentation engine 220. In particular, the loyalty reward module 226 can adapt the content (e.g., loyalty reward) contained in each loyalty reward program to be most effective for a particular customer segmentation.

For example, for a segment of merchants in a line of business that sells low-cost goods (e.g., coffee, food truck items, etc.), the loyalty reward module 226 generates a loyalty reward program that rewards a customer with a free item after several purchases (e.g., "Buy 5 coffees, Get 6th Free"). In another example, for a segment of high-end retailer merchants, the loyalty reward module 226 generates a loyalty reward program that rewards the customer with a VIP status (accompanied by various benefits) for spending a certain amount (e.g., $20,000 worth of purchases in the last month).

In some embodiments, the loyalty reward module 226 facilitates the loyalty reward program by tracking the financial transactions conducted between the merchant and a customer and automatically maintaining the reward points on the customer's digital receipt. The loyalty reward module 226 can track by specific purchase items, specific visits to a merchant's business, or a frequency of visit. For example, the loyalty reward module automatically tracks a coffee purchase at the time of the transaction and digitally "punches" a digital card of the loyalty reward program in the receipt to mark such purchase. In such example, when the required number of "punches" is met, the loyalty reward module 226 can, for example, automatically generate a loyalty reward for the customer via the loyalty reward program, or automatically updates the customer's status to "VIP" in order to enjoy certain benefits from the merchant.

The tipping module 228 works in coordination with the analytics engine 220 to generate tipping programs for the merchant platform 206. The tipping programs can be displayed using the display output generator 210 to enable selection by the merchant to include in the customized digital receipt. The tipping module 228 can generate the tipping programs based on the analytics generated by the analytics engine 220 (e.g., customer segmentation and/or merchant segmentation).

The tipping module 228 can generate the tipping programs based on a predetermined transaction amount (e.g., payment amount). For example, the tipping module 228 can generate the tipping programs based on the predetermined transaction amount in association with customer segmentation, merchant segmentation, and/or any other analytics. In one example, the tipping module 228 generates tipping programs with percentage tipping values (e.g., 15%, 18%, and 20%) for a service-oriented merchant (e.g., restaurant), and tipping programs with whole dollar amount values (e.g., $1, $2, and $3) for transactions under $10 conducted between the merchant and customers. That is, the tipping module 228 can adapt the tipping values contained in each tipping program to be most effective based on the customer, the merchant, and/or the goods or services involved in the transaction.

The tipping module 228 can also analyze whether tipping is appropriate for a particular transaction. For example, no tipping program is generated for service offered by an accountant. In some embodiments, the tipping module 228 utilizes the analytics to adapt the tipping scales of various tipping programs to be most effective. The analytics utilized for the tipping scales can include analyzed data of tipping history or type of product and/or service. For example, for a customer with a tipping history reflecting very low tip amounts, the tipping module 228 generates a tipping program with a default tipping scale of 10%, 15%, and 20%. In such example, the merchant is able to make sure the customer gives a minimum tipping value of 10% of the transaction amount. In another example, for a merchant that offers personal services (e.g., massage, housekeeping, etc.), the tipping module 228 generates a tipping program with a tipping scale of 15%, 18%, 20%. In yet another example, for merchants that sell low-cost goods (e.g., food truck), the tipping module 228 generates a tipping program with tipping values of $1, $2, and $3.

In some embodiments, the tipping module 228 provides the capability to change a tipping amount subsequent to an initial submission of the tipping amount, where the tipping amount can be changed within a predefined period of time. The time period can be, for example, an hour, a day, a week, or any other desired time period (e.g., unlimited). The time period can be configured by the merchant or by an administrator of the platform system. For example, after a customer receives a digital receipt (e.g., mobile app or e-mail) for a financial transaction, the customer can submit a tip value via a tipping feature included in the receipt within 24 hours, as specified by the platform system. In such example, the customer is able to change the tip value up to a day later (e.g., at home) by submitting another tip value via the tipping feature included in the receipt.

The tipping value can be changed using various methods, depending on the implementation of the customized digital receipt. For example, where the digital receipt is a text message, the customer can send within 30 minutes a second tipping amount in a second reply text message to change the tip for the transaction. In another example, where the digital receipt is an email with a Uniform Resource Locator (URL) link that takes the user to a tip submission web page, the customer can change the tip by clicking on the URL link within 24 hours to submit a second tipping amount. It is noted the URL link can also be a part of a text message or a part of the text box within a mobile.

In some embodiments, the promotion module 224, the loyalty reward module 226, and the tipping module 228 work in coordination with one another to generate only those feature programs that are most impactful for a particular customer segmentation. For example, for a coffee shop merchant, a loyalty reward program, instead of a promotion discount program (e.g., "30% Off") is generated as a recommendation for the merchant to include in the customized digital receipt. In another example, for a high-end retailer, a promotion discount program (e.g., "20% Off $200 Purchase") is generated as a recommendation to include in the customized digital receipt.

The results engine 230 obtains results data associated with an implementation of a customized digital receipt containing various programs added by a merchant. The results data are obtained from customer interactions with the various programs of the receipt delivered to one or more customers of the merchant. The results data can include information associated with customer response rates in relation to the various programs presented on the receipt. The results data can be stored in the repository 202.

The results engine 230 analyzes the results data and provides one or more reports to the merchant via the merchant platform 206 using, for example, the display output generator 210. Based on the reports, or results, the merchant can further customize the digital receipt using the merchant platform 206 to address business deficiencies reflected in the results. For example, the results engine 230 generates results indicating that only 25% of new customers come back after receiving a feedback program with a long questionnaire, but that 90% of new customers come back after receiving a "Free Item" promotion on their receipts. In such example, the merchant can make various adjustments. The merchant, for example, can add a coupon in addition to the questionnaire to the digital receipt, can replace the feedback program (with the low 25% reception) with a different feedback feature (e.g., one with a short questionnaire) for inclusion in the receipt, or can remove the feedback program completely. In some embodiments, the results engine 230 generates automatic resolution programs in response to receiving negative feedback results.

Figure 3:
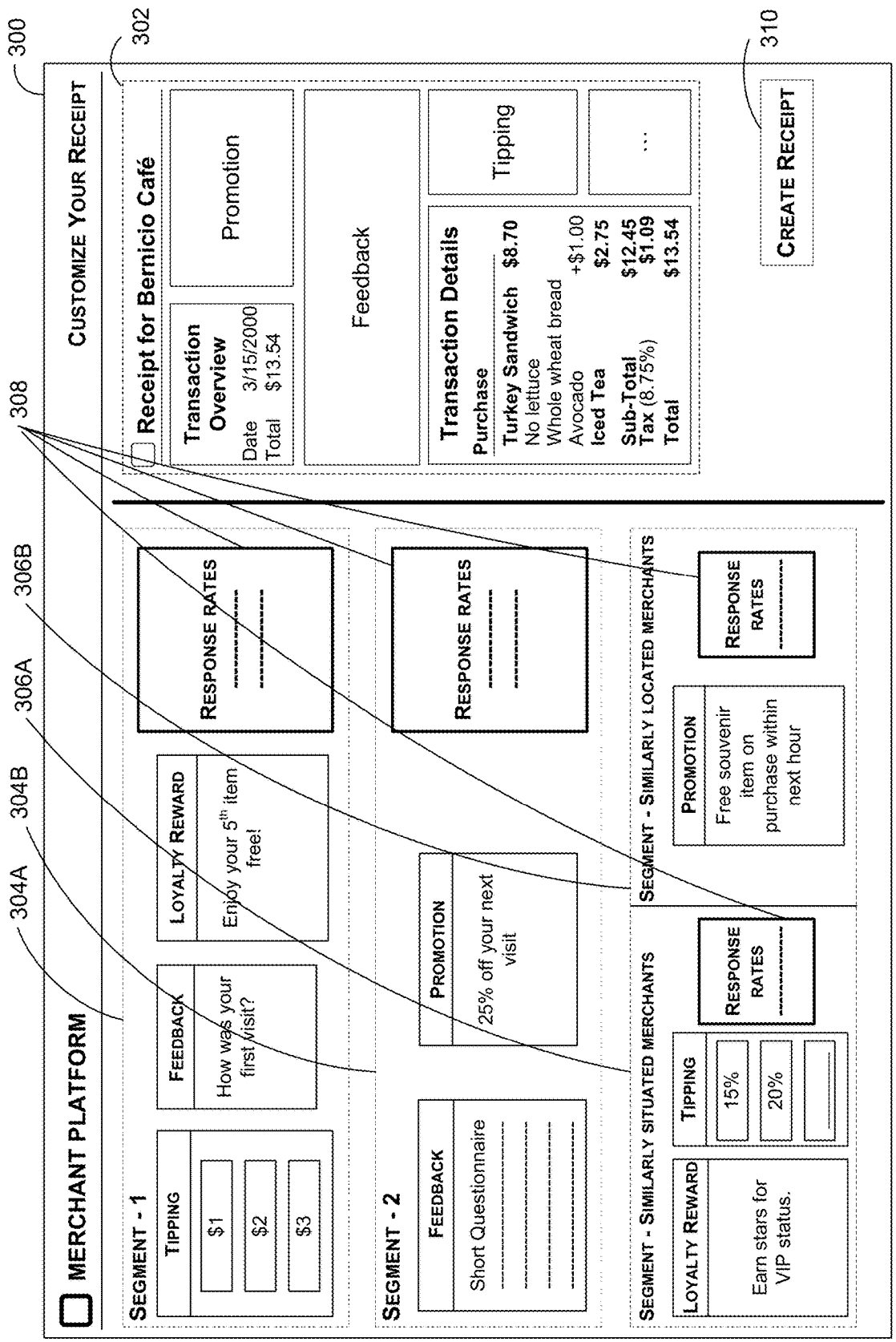
FIG. 3 is a representative graphical user interface of a merchant platform for generating feature programs for incorporating into a digital receipt.

FIG. 3 is a representative user interface of a merchant platform 300 for generating one or more feature programs for incorporating into a receipt template for a digital receipt 402, according to various embodiments of the disclosed technology. The merchant platform 300 can be an application that runs on a merchant's computing device (e.g., a mobile merchant application), or can be accessed by an application operating on the merchant's computing device (e.g., a merchant portal accessible via a web browser application). The computing device of the merchant can be the device 102 of FIG. 1.

The merchant platform 300 enables the merchant to perform various tasks in creating the template for the digital receipt 302. For example, the merchant platform 300 allows the merchant to perform a "drag-n-drop" operation for selecting a feature program to include in the digital receipt 302. The feature program can be, for example, a feedback program, a loyalty reward program, a promotion program, and/or a tipping program, among other feature programs. The merchant platform 300 can present one or more programs of each feature for selection by the merchant. The platform 300 generates the feature programs based on customer segmentation analytics that indicate certain programs are more effective in targeting certain customers based on various attributes (e.g., new customer, geographical location, similarly situated merchants, etc.).

In the illustrated embodiment of FIG. 3, the merchant platform 300 generates feedback programs for customer segments 304A, 304B, 306A, and 306B. It is noted while the illustrated embodiment includes four segments, one of ordinary skill in the art will understand that a lesser or a greater number of segments and other organization of the programs in relation to those segments may be included in other embodiments. Further, one of ordinary skill in the art will appreciate that other configurations and features of the merchant platform 300 are possible in light of the disclosure here.

In customer segment 304A, the platform 300 presents a tipping program, a feedback program, and a loyalty reward program with analytics indicating the effectiveness of those programs in regards to a customer segment, such as a segment of new customers. For example, the analytics indicate that new customers generally prefer a loyalty reward program coupled with a feedback program and a tipping feature program. The programs can further be presented with analytics indicating particular customized content of each feature perform well with a customer segment according to, for example, attributes associated with the customer or the transaction. For example, the platform 300 presents a "5th item free" loyalty reward and a feedback with a "first visit" questionnaire with analytics indicating new customers generally react well to a free item and questions tailored to their first experience with the merchant.

In another example, the platform 300 presents a tipping program with default small value amounts of $1, $2, and $3 with analytics indicating that new customers in certain transactions (e.g., price is under $15) generally prefer to tip in small value amounts. An example of such transaction is a food truck purchase. Another example of such transaction is a quick car wash service. In some embodiments, the platform 300 presents no tipping program based on the customer or transaction attributes. For example, for a tax accountant offering tax services to a customer, the platform 300 does not present a tipping program as a recommendation for inclusion in the customer's receipt, as such practice is not customary in such transaction.

In customer segment 304B, the platform 300 presents a feedback and a promotion program that are different from those offered in customer segment 304A. The programs in segment 304B include analytics indicating such programs are generally effective, for example, with a segment of returning customers. In some embodiments, the programs associated with the returning customer segment can further be presented with analytics indicating particular customized content of each program performs well with returning customers. For example, the analytics indicate that returning customers generally prefer a "25% off" promotion program coupled with a short questionnaire feedback program tailored to returning customers.

In customer segment 306A, the platform 300 presents a loyalty reward program and a tipping program with analytics indicating the effectiveness of those programs in regards to customers of similarly situated merchants. For example, for a hair salon merchant, the analytics indicate that similarly situated merchants (e.g., provider of similar service) often provide a loyalty reward program coupled with a tipping program for their customers. In another example, for a high-end retailer, the platform 300 presents a discount promotion program (instead of a loyalty reward program) and a feedback program (instead of a tipping program) with analytics indicating that these two programs, when coupled together, have performed well for high-end retailers. In yet another example, where the merchant is a coffee shop, the platform 300 presents a loyalty reward program that tracks the consumer's purchases, along with analytics indicating such program has performed well for other coffee merchants.

The platform 300 can also present a tipping program with default percentage tipping values along with analytics indicating that similarly situated merchants prefer percentage tipping. In some embodiments, the platform 300 presents particular percentages appropriate for the merchant segment. For example, the platform 300 recommends tipping percentages of 15%, 20%, and 25% as the default values to include in the receipt. In another example, the platform 300 recommends tipping percentages of 10%, 15%, and 18%. In another example, the platform 300 recommends allowing the customer to submit the desired tip amount (e.g., a number or a percentage).

In customer segment 306B, the platform 300 presents various programs with analytics indicating that such programs have performed well with a segment of customers of similarly located merchants. For example, for a merchant located in the financial district of San Francisco, CA, the analytics indicate that other similarly located merchants provide a loyalty reward feature program to incentivize certain behaviors in customers (e.g., to visit the merchant's business on a daily basis during work hours). In another example, for merchant X located in Palo Alto, CA, the platform 300 presents promotion programs to incentivize in customers certain behaviors associated with the downtown area (e.g., to remain in the area longer and revisit merchant X, to visit other Palo Alto merchants affiliated with merchant X, etc.). In yet another example, for a merchant located in Union Square of San Francisco, CA, the platform 300 presents a "Free souvenir" promotion that typically performs well for merchants located in Union Square.

In some embodiments, the platform 300 presents customer response rates 308 in association with the various programs in a particular segmentation (e.g., 304A, 304B, 306A, and 306B). For example, in a customer segmentation 306A, the merchant platform 300 can present Feedback Program 1 and Loyalty Reward Program 3 with response rates indicating that, for merchants that are similarly situated, these programs often result in effective responses from customers (e.g., 90% of customers answer the questions in Feedback Program 1 and 95% of customers have opened and used Loyalty Reward Program 3). Providing such response rates enables the merchant to make a more informed decision in selecting a particular program for incorporation into the receipt 302.

By looking at the programs and the associated analytics provided by the merchant platform 300, the merchant can target certain customers (e.g., new customers, high-end retail customers, etc.) more effectively by selecting one or more of the programs presented in a particular segment (e.g., 304A, 304B, 306A, or 306B) to include in the customized digital receipt 302. Once the merchant is finished selecting programs to include in the receipt 302, the merchant can request the receipt to be generated. For example, the merchant can click a "Create Receipt" button 310 of the merchant platform 300. Upon receiving the merchant's request to create the receipt 302, the merchant platform 300 causes the receipt to be generated and delivered to one or more customers. In some embodiments, the receipt template for the receipt 302 is stored (e.g., in repository 202 of FIG. 2), and invoked at a later time. For example, when a new transaction has been initiated by a customer belonging in a particular segmentation associated with the generated receipt template, the receipt 302 is delivered using the generated template.

Figure 4:
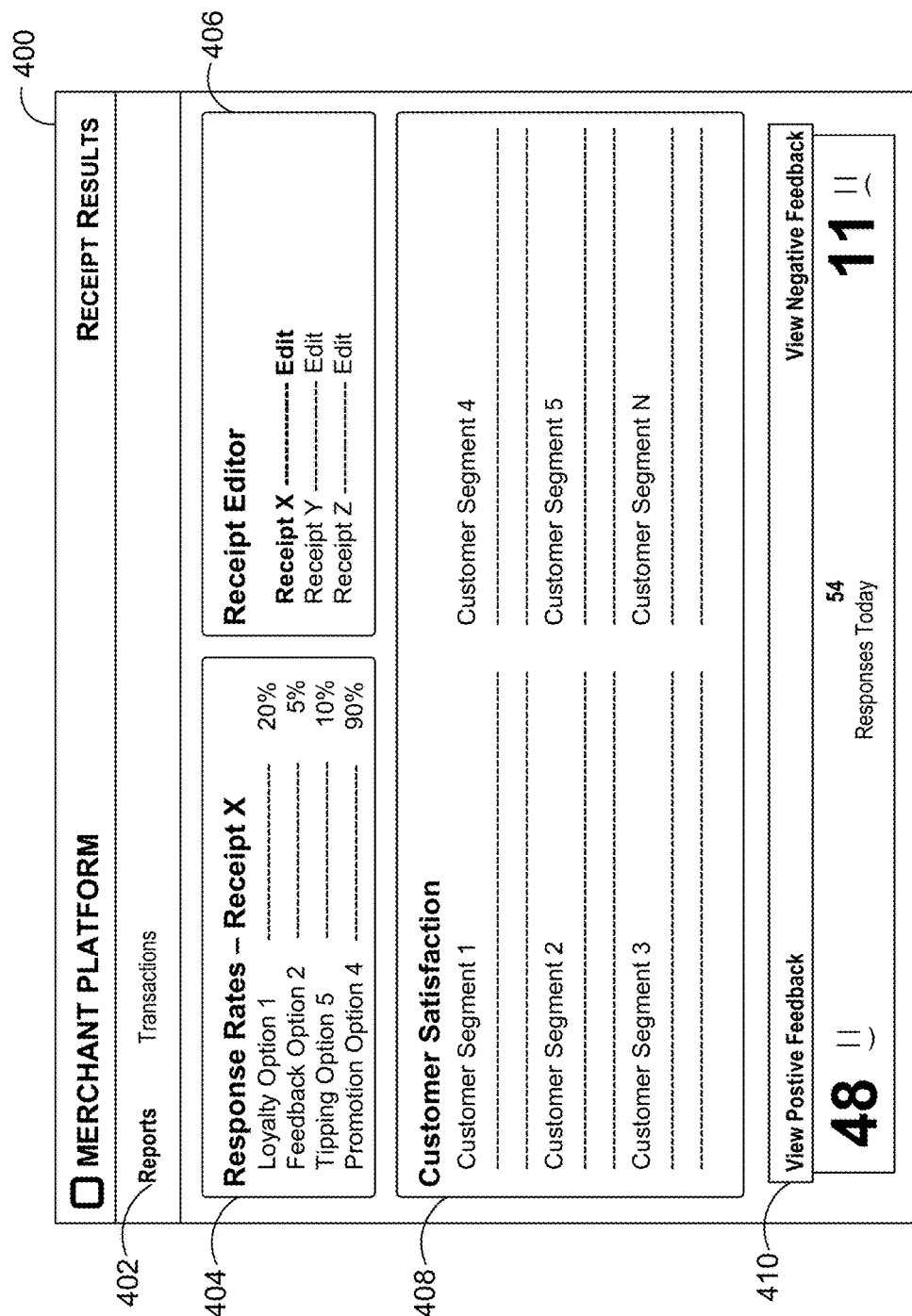
FIG. 4 is a representative graphical user interface of a merchant platform for viewing results associated with feature programs implemented in a digital receipt.

FIG. 4 is a representative graphical user interface of a merchant platform 400 for viewing results associated with feature programs implemented in a customized digital receipt, in accordance with various embodiments of the disclosed technology. As used here, the term "customized digital receipt" refers generally to a receipt having customized content tailored to a particular customer or group of customers. In some embodiments, the results are obtained through the customized digital receipt (e.g., receipt 302 of FIG. 3) delivered to one or more customers at the completion of a transaction. In some embodiments, the results are obtained through other delivery mechanisms, such as a third party service working in coordination with a receipt customization system (e.g., merchant platform server 120 of FIG. 1). In such embodiments, the third party service aggregates various results associated with the various features provided on the customized digital receipt, and transmits the results to the merchant platform 400. For example, an example third party service that aggregates feedback results can be Yelp.com, Urban Spoon, or YP.com.

The merchant platform 400 enables the merchant to perform various tasks in viewing and interacting with the results. For example, the merchant can view reviews submitted by customers for a feedback feature included in the customized digital receipt delivered to those customers to make business changes accordingly. In another example, the merchant can view customer response rates associated with the features included in the customized digital receipt, and can further customize the receipt for future transactions using the platform 400.

In the illustrated embodiment of FIG. 4, the merchant platform 400 allows the merchant to view reports 402 associated with the results. In some embodiments, the reports include customer response rates 404, receipt editor 406, customer satisfaction 408, and/or feedback responses 410. According to the embodiment, the customer response rates 404 includes responses obtained from all customers that have received the customized digital receipt containing various features added in by the merchant using a receipt customization platform (e.g., merchant platform 300 of FIG. 3). A customer response can include whether a customer has accessed, or interacted with, a feature in the customized digital receipt (e.g., opened a promotion feature to redeem a coupon).

In one example, for a customized digital receipt X that includes a loyalty program 1, feedback program 2, tipping program 5, and promotion program 4, the customer response rates 404 presents percentage values 20%, 5%, 10%, and 90% respectively indicating the customers' reception to those features presented on the receipt. In the example, the merchant can see that for the loyalty reward program added to the receipt, only 20% of the customers actually activated the loyalty reward feature to start earning points with the merchant, while 80% did not bother to access the feature. Having such knowledge, the merchant can take actions, such as changing an aspect of the business or customizing further the features included in receipt X using the receipt editor 406. The receipt editor 406 allows the merchant, for example, to remove completely the loyalty reward feature or to select a different loyalty reward feature program for inclusion in the receipt in future transactions. In some embodiments, the receipt editor 406 can be integrated with the merchant platform 300 of FIG. 3.

According to the embodiment, the customer satisfaction 408 presents customers' satisfaction with various aspects of a merchant's place of business. In some embodiments, the customer satisfaction 408 presents satisfaction statistics based on customer segmentation (e.g., customer segments 1–N). For example, the merchant can view results indicating that for the customer segment of females aged 20-30, coffee beverage X is a favorite purchase. In some embodiments, the customer satisfaction 408 can be presented as a graph. For example, the graph displays levels of satisfaction with service, wait time, and noise level at the merchant's place of business.

The merchant can view additional details about customers' satisfaction by looking at the feedback responses 410. For example, the merchant can view details of a negative review submitted by a customer. In some embodiments, the merchant platform 400 provides recommended resolution options to the merchant when the merchant is viewing the negative feedback. For example, the merchant platform 400 generates and presents to the merchant a recommended reply message that acknowledges the negative experience and provides the customer a promotion reward.

In some embodiments, the merchant platform 400 provides automatic resolution options for the merchant to address the negative feedback. For example, the merchant platform 400, in response to receiving a negative feedback result from a customer, transmits to the customer an automatic reply message acknowledging the negative experience along with a "Free Item" coupon. In some embodiments, the merchant platform 400 allows the merchant to configure the automatic resolution options.

Figure 5:
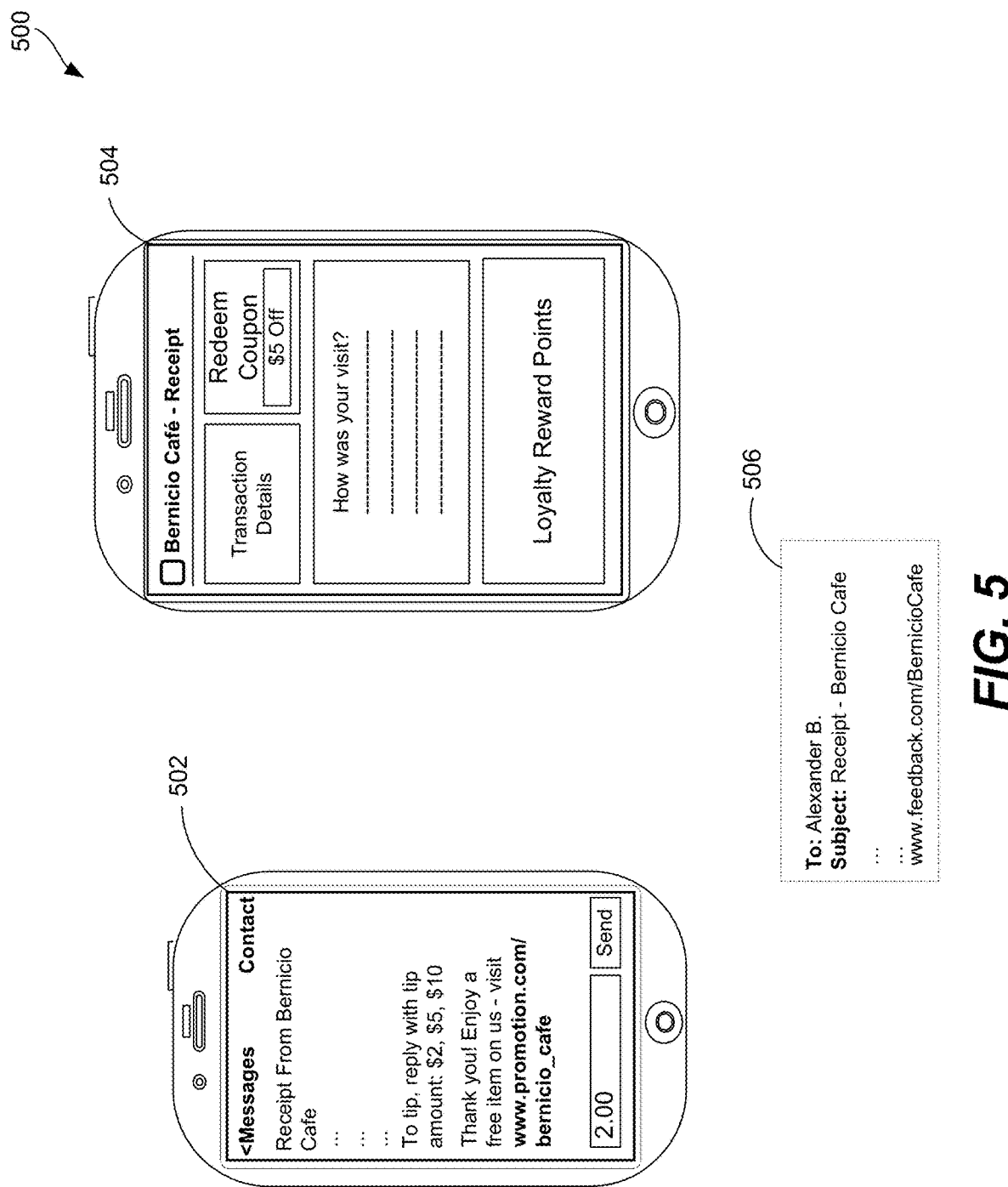
FIG. 5 is an illustration of various embodiments of a customized digital receipt with feature programs.

FIG. 5 is an illustration of various embodiments of a customized digital receipt for a financial transaction between a merchant and a customer. The customized digital receipt can be the receipt 302 of FIG. 3. A merchant platform system can generate the customized digital receipt in response to receiving an indication from a merchant POS system to generate a receipt for a customer. The POS system sends the indication to the merchant platform system, for example, when the merchant finalizes the customer's account and enters a credit card number or other payment information of the customer. The merchant platform system generates the customized digital receipt for the customer in accordance with customization options selected by the merchant in creating the receipt (e.g., feature options selected for inclusion in the receipt using a merchant platform GUI).

As illustrated in FIG. 5, the receipt can be in the form of a text message 502, a mobile receipt application 504, or an e-mail message 506. The text message 502, the mobile receipt application 504, or the e-mail message can be received at a computing device of the customer (e.g., smartphone, tablet, desktop computer, etc.) The customer can interact with various features offered on the receipt to perform various tasks associated with the financial transaction.

For example, upon receiving the receipt via the text message 502, a user can add on a tipping amount to the transaction by replying to the text message 502 with a numeric value to add a tip to the transaction (e.g., "2.00" for a $2.00 tip). In another example, upon receiving the receipt as part of the mobile receipt application 504, the customer can interact with the application's various user interfaces that display receipt features associated with the transaction. In such example, the receipt includes transaction details along with a coupon, a feedback questionnaire, and a loyalty reward points features. In yet another example, the interactive digital receipt is the email message 506 with a URL link that takes the customer to a web page that allows adding of the tipping amount.

Figure 6:
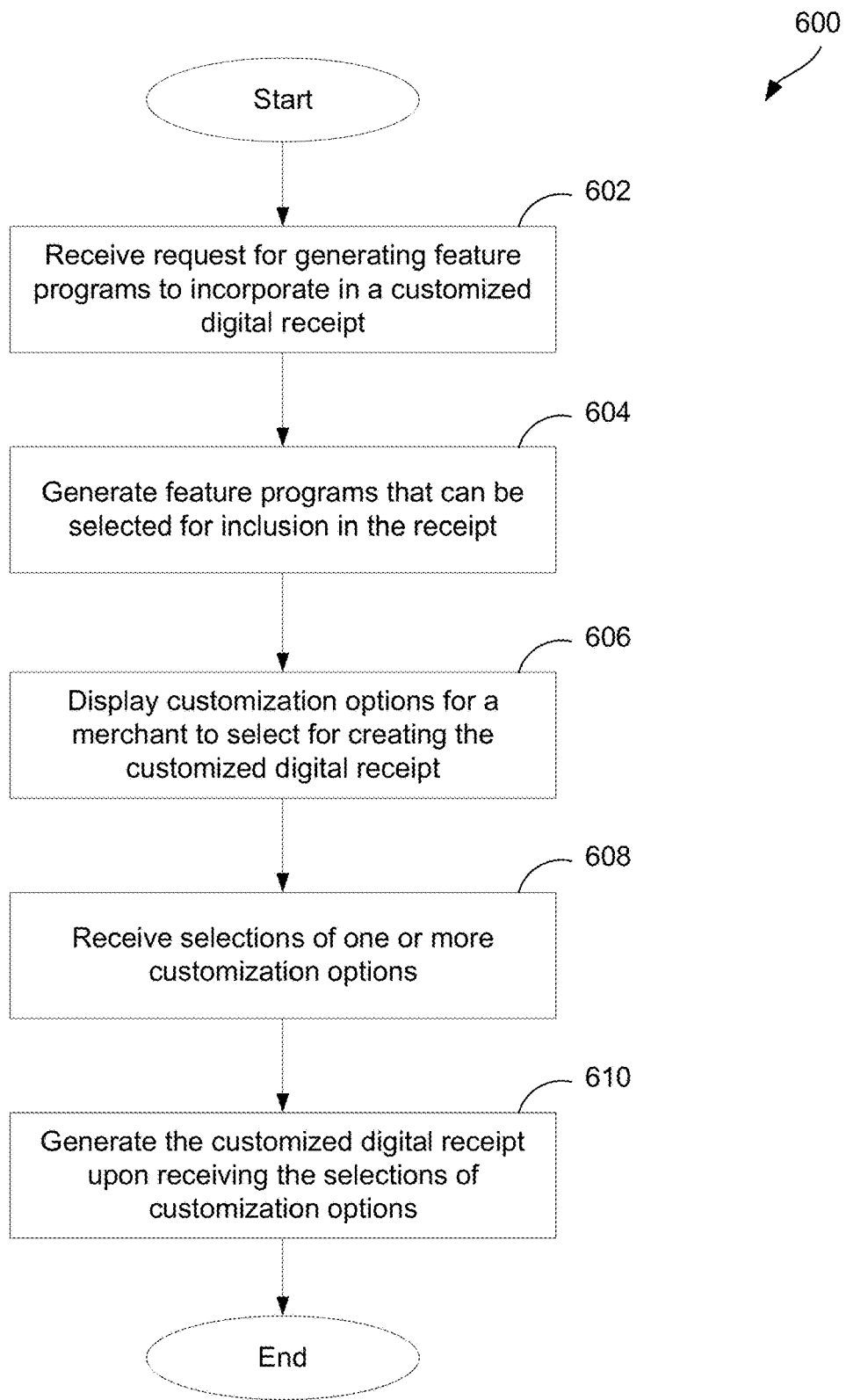
FIG. 6 is a representative process for incorporating feature programs into a digital receipt.

FIG. 6 is a flow chart of a process 600 for generating a customized digital receipt associated with a financial transaction. The process 600 can be performed by the server system 120 of FIG. 1. The process 600 may be implemented upon request by a merchant user using a merchant platform. At step 602, the system receives a request for generating feature programs for incorporating in a customized digital receipt based on customer segmentation. The request can include information about one or more attributes associated with a customer whose interests and/or needs a merchant desires to target. For example, the merchant desires to create a receipt that targets young, out-of-town customers (e.g., visitors). In such example, the one or more attributes can include a geographical location attribute (e.g., out-of-town), an age range attribute, and an income range attribute.

At step 604, the system generates a set of feature programs as recommendations for the merchant to include in the customized digital receipt. The system generates the customization programs based on customer segmentation analytics. The customer segmentation analytics indicate which particular feature options are more impactful to include in the customized digital receipt. The set of feature programs include one or more feature programs that allow a customer to interact with the receipt. The set of feature programs can include, for example, a feedback program, a promotion program, a loyalty reward program, or a tipping program, where the programs are tailored to the customer to incentivize certain actions from the customers that can help the merchant's business.

The feedback program includes customized content that allows the customer to submit a review of the merchant (e.g., satisfaction with service, noise level, overall visit, etc.). The promotion program includes customized content that allows the customer to redeem certain promotions with the merchant and/or affiliated merchants. The loyalty reward program includes customized content that allows the customer to track and maintain loyalty reward points and/or loyalty status with the merchant's business. The tipping program includes customized content that allows the customer to add a tip at the completion of a transaction with the merchant.

At step 606, the system displays the set of feature programs for selection by the merchant to include in the receipt. The system can display the options via, for example, a graphical user interface that enables a user (e.g., merchant) to interact with the displayed set of feature programs, such as selecting and dragging a feature program into a digital receipt. At step 608, the system receives a selection of one or more feature programs from the merchant. The merchant can select, for example, a promotion program with a promotion game and a tipping program with a percentage tipping scale to include in the receipt. At step 810, upon receiving the selection of one or more feature programs from the merchant, the system generates the customized digital receipt. The customized digital receipt can later be delivered to a customer when a transaction is carried out between the merchant and the customer belong to a particular customer segmentation for which the receipt has been designed. Delivery of the customized digital receipt includes delivering the content customized by the merchant (e.g., options selected in process 600) and delivering the transaction information (e.g., purchased items, prices, total amount, date, etc.).

Figure 7:
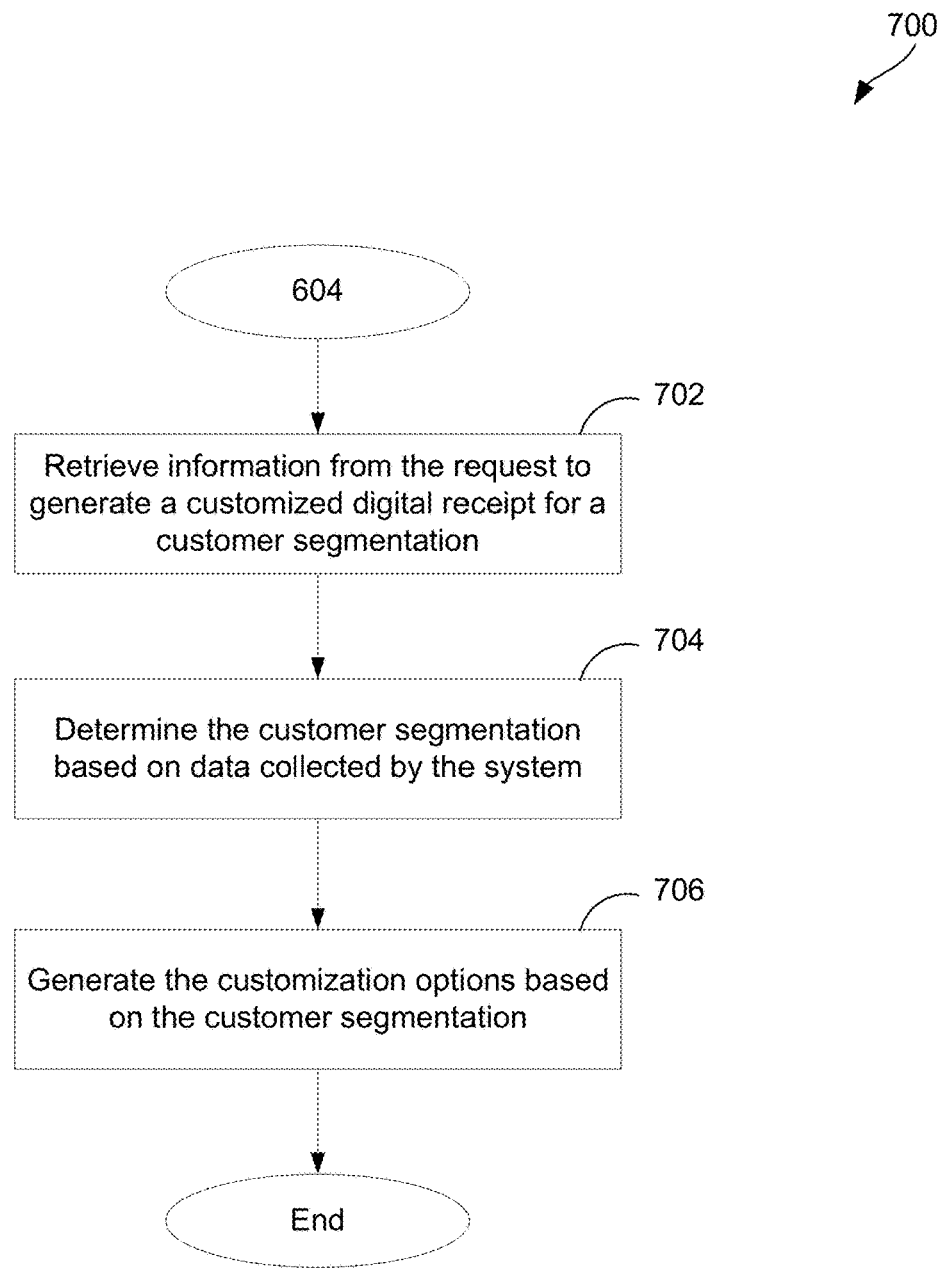
FIG. 7 is a representative process for generating the feature programs.

FIG. 7 is a representative process 700 for generating the set of feature programs for a customized digital receipt. The process 700 can take place at step 604 of the process 600 in FIG. 6. The process 700 can be performed by the financial service system 200 of FIG. 2 (hereinafter, "system"). At step 702, the system analyzes the request from the merchant to retrieve input information from the merchant's request to create the customized digital receipt. The input information can include attributes associated with a customer to whom the merchant wishes to target with the customized digital receipt. For example, the attributes can include a geographical location (e.g., location where the customer visits the merchant's store, residence of the customer, etc.) and an age range of customers the merchant wishes to target.

At step 704, the system retrieves customer segmentation analytics based on the input information of the request to determine a particular customer segmentation on which to base the generation of the feature programs. The customer segmentation analytics can be generated by the customer segmentation engine 220 of FIG. 2. In some embodiments, the system retrieves customer segmentation analytics already generated and stored in the repository 202 of FIG. 2. In other embodiments, the system generates the customer segmentation analytics in real-time in response to the merchant's request to create the receipt.

At step 706, the system generates the feature programs based on the customer segmentation. In particular, the feature programs are based on attributes derived from data that indicate certain programs are more effective for a particular customer segmentation. The attributes can include a customer response rate attribute, a new customer attribute, a frequency of visit attribute, a geographical location attribute, an income range attribute, a spending trend attribute, a similarly situated attribute, or a similarly located attribute.

For example, the system can identify at step 706 that a "VIP status" loyalty reward program and a "travel" promotion program are impactful to customers within the "25-35 years old" segment who often make rare tea collection purchases. Based on the identification of such programs, the system presents the programs to the merchant for incorporating into the customized digital receipt.

Figure 8:
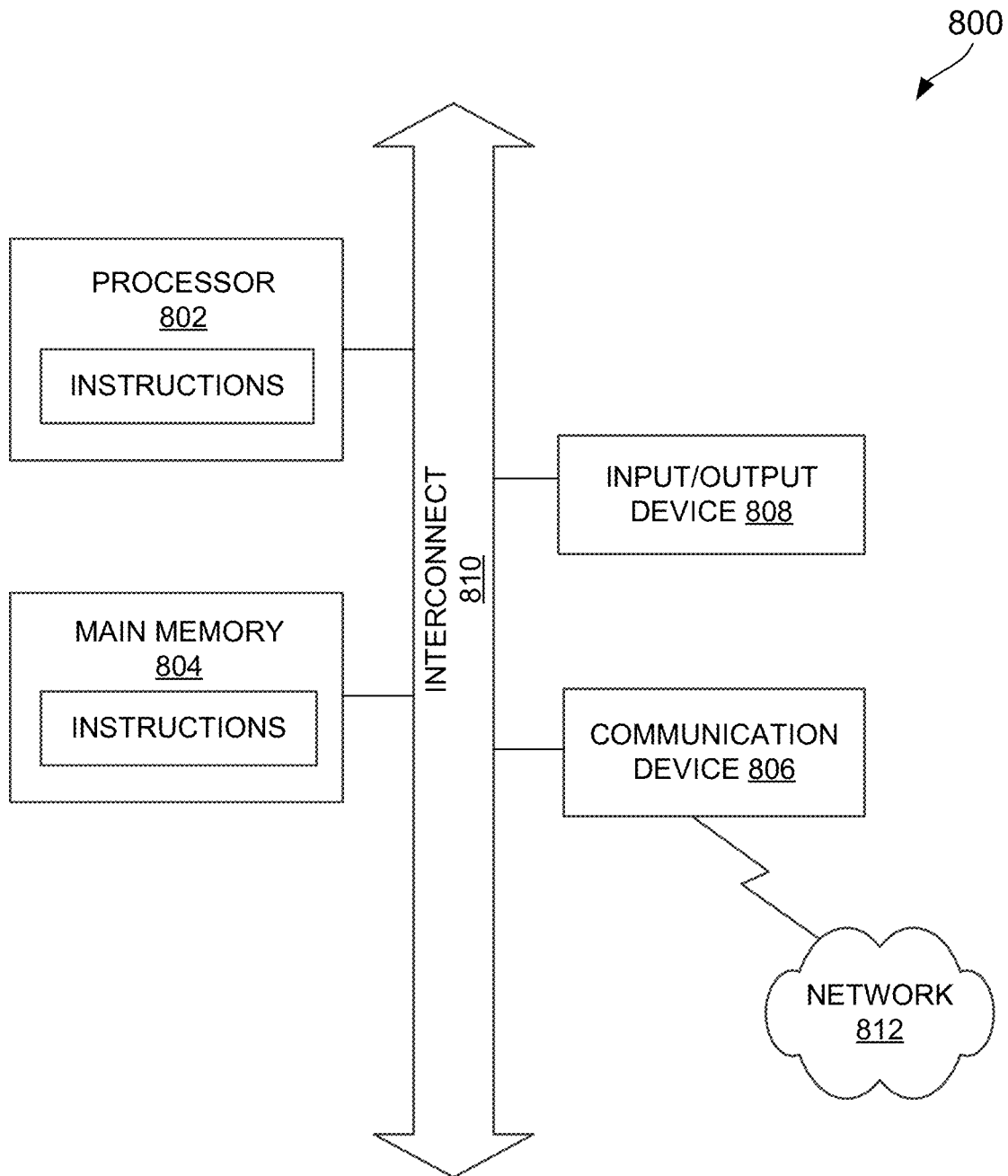
FIG. 8 is an example processing system in which methodologies described here can be executed.

FIG. 8 is an example processing system in which methodologies described here can be executed. In the example of FIG. 8, the computer system 800 includes one or more processor 802, memory 804, and a communication device 808. Various common components (e.g., cache memory) are omitted for illustrative simplicity. The computer system 800 is intended to illustrate a hardware device on which any of the components depicted in the examples of FIGS. 1-7 (and any other components described in this specification) can be implemented. In some embodiments, a given component described above may be implemented by two or more physical computer systems such as computer system 800 in FIG. 8, which may be coupled to each other via one or more networks 812. The computer system 800 can be of any known or convenient type. The components of the computer system 800 can be coupled together via one or more buses, bridges, adapters, point-to-point connections and/or any other known or convenient form(s) of interconnect.

The computer system 800 can take any suitable physical form. As example, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe computer, a mesh of computer systems, a mobile telephone, a personal digital assistant (PDA), a server, or a combination of two or more of these.

Where appropriate, computer system 800 may include one or more computer systems 800; be unitary or distributed; span multiple locations; span multiple machines; or reside in a cloud, which may include one or more cloud components in one or more networks 812. Where appropriate, one or more computer systems 800 may perform without substantial spatial or temporal limitation one or more steps of one or more methods described or illustrated herein. As an example, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

The processor 802 can be or include, for example, a conventional programmable microprocessor, microcontroller, application specific integrated circuit (ASIC), programmable logic device (PLD), or the like, or a combination of such devices. The memory 804 is coupled to the processor by, for example, a bus. The memory can be or include, for example, random access memory (RAM), such as dynamic RAM (DRAM) or static RAM (SRAM). The memory can be local, remote, or distributed.

The interconnect 810 couples the processor 802 to the communication device 806. The communication device 806 can include one or more of a modem or network interface. A person of ordinary skill will appreciate that a modem or network interface can be considered to be part of the computer system 800. The communication device 806 can include an analog modem, ISDN modem, cable modem, token ring interface, satellite transmission interface (e.g. "direct PC"), Wi-Fi interface, or other interfaces for coupling a computer system to other computer systems. The communication device 806 can be coupled to one or more input and/or output devices 808. The I/O devices 808 can include, by way of example, a keyboard, a mouse or other pointing device, disk drives, printers, a scanner, and other input and/or output devices, including a display device. The display device can include, by way of example, a cathode ray tube (CRT), liquid crystal display (LCD), or some other applicable known or convenient display device.

What is claimed is:

1. A method comprising:
    obtaining, by a service provider, first transaction data relating to payment transactions of a plurality of merchants, wherein the first transaction data includes details relating to customers associated with the payment transactions;
    storing, by the service provider in a central database, the first transaction data;
    generating, by the service provider and based at least in part on the first transaction data, a first customer segment comprising first customers of similarly-situated merchants to a merchant of the plurality of merchants, wherein the similarly-situated merchants are associated with one or more shared merchant attributes;
    generating, by the service provider and based on statistical analysis applied to the first transaction data, a second customer segment comprising second customers associated with one or more shared customer attributes;
    causing presentation of, by the service provider, and via one or more user interfaces of a device associated with the merchant a first recommendation that the merchant present a first subset of a plurality of feature programs to the first customer segment and a second recommendation that the merchant present a second subset of the plurality of feature programs to the second customer segment, wherein the plurality of feature programs comprises at least two of a tipping program, a loyalty program, a promotion program, and a feedback program for inclusion on a customer communication;
    determining, based on receiving data indicating interaction with the first recommendation, merchant acceptance of the first recommendation; and
    responsive at least in part to receiving, by the service provider and from a point-of-sale (POS) device of the merchant, second transaction data associated with a customer of the first customer segment, causing presentation, by the service provider, of the first subset of the plurality of feature programs via a user device of the customer.

2. The method as claim 1 recites, wherein the one or more shared merchant attributes comprise one or more of a similar location; a similar merchant type; a similar good or service offered for sale; or a similar customer base.

3. The method as claim 1 recites, wherein the one or more shared customer attributes comprise one or more of whether a customer is a new customer; a customer response rate; a frequency of visit; a geographical location; an age range; an income range; a spending trend; a similarly situated merchant; or a similarly located merchant.

4. The method as claim 1 recites, further comprising:
    determining the first subset and the second subset based at least in part on an effectiveness of historical communications by the similarly-situated merchants.

5. The method as claim 1 recites, further comprising:
    determining the first subset based at least in part on a shared merchant attribute of the one or more shared merchant attributes.

6. The method as claim 1 recites, wherein the one or more user interfaces comprise a single user interface.

7. The method as claim 1 recites, further comprising customizing at least one feature program of the first subset based on an attribute of the first customer segment.

8. The method as claim 1 recites, wherein the first recommendation comprises a plurality of selectable icons, and wherein an individual selectable icon of the plurality of selectable icons corresponds to a feature program of the first subset.

9. The method as claim 8 recites, wherein the interaction comprises a first interaction and the method further comprising:
    receiving an indication of a second interaction with a first selectable icon of the plurality of selectable icons of the first subset.

10. The method as claim 9 recites, wherein the second interaction is associated with identification of content to be displayed in association with the feature program corresponding to the first selectable icon.

11. The method as claim 1 recites, wherein causing presentation via the user device of the customer comprises causing presentation via a digital receipt.

12. A system comprising:
    one or more server devices associated with a service provider, the one or more server devices having one or more non-transitory computer-readable media storing instructions executable by one or more processors, wherein the instructions program the one or more processors to perform acts comprising:
        obtaining, from a plurality of merchant devices, first transaction data relating to payment transactions of a plurality of merchants, wherein the first transaction data includes details relating to customers associated with the payment transactions;
        storing, in a central database, the first transaction data;
        generating, based at least in part on the first transaction data, a first customer segment comprising first customers of similarly-situated merchants of a merchant of the plurality of merchants, wherein the similarly-situated merchants are associated with one or more shared merchant attributes;
        generating, based on statistical analysis applied to the first transaction data, a second customer segment comprising second customers associated with one or more shared customer attributes;
        causing presentation of, via one or more user interfaces of a device associated with the merchant, a first recommendation that the merchant present a first subset of a plurality of feature programs to the first customer segment and a second recommendation that the merchant present a second subset of the plurality of feature programs to the second customer segment, wherein the plurality of feature programs comprises at least two of a tipping program, a loyalty program, a promotion program, and a feedback program;
        receiving, from the device associated with the merchant, an indication of interaction with the second recommendation;
        receiving second transaction data associated with a transaction between the merchant and a customer of the second customer segment; and responsive at least in part to receiving the second transaction data, causing presentation of the second subset via a user device of the customer.

13. The system as claim 12 recites, the acts further comprising:
processing, based at least in part on the first transaction data, payments for the payment transactions for the plurality of merchants, wherein the plurality of merchants have payment processing accounts registered with the service provider.

14. The system as claim 12 recites, the acts further comprising:
determining the feature programs of the first subset and the second subset based at least in part on analyzing effectiveness of feature programs used by the similarly-situated merchants.

15. The system as claim 12 recites, wherein the one or more shared merchant attributes comprise one or more of a similar location; a similar merchant type; a similar good or service offered for sale; or a similar customer base.

16. The system as claim 12 recites, the acts further comprising customizing at least one feature program of the first subset based on an attribute of the first customer segment.

17. A method comprising:
obtaining, by a service provider, first transaction data relating to payment transactions of a plurality of merchants;
generating, by the service provider and based at least in part on the first transaction data, a first customer segment comprising first customers of similarly-situated merchants to a merchant of the plurality of merchants, wherein the similarly-situated merchants are associated with one or more shared merchant attributes;
generating, by the service provider and based on statistical analysis applied to the first transaction data, a second customer segment comprising second customers associated with one or more shared customer attributes;
causing presentation of, by the service provider, and via one or more user interfaces of a merchant device associated with the merchant, a first recommendation that the merchant present a first subset of a plurality of feature programs to the first customer segment and a second recommendation that the merchant present a second subset of the plurality of feature programs to the second customer segment;
receiving, from the merchant device, second transaction data associated with a transaction between the merchant and a customer;
based on determining that the customer is a member of the first customer segment and receiving a first indication of a first interaction with the first recommendation, causing presentation, by the service provider, of the first subset via a user device of the customer; and
based on determining that the customer is a member of the second customer segment and receiving a second indication of a second interaction with the second recommendation, causing presentation, by the service provider, of the second subset via the user device of the customer.

18. The method as claim 17 recites, wherein causing presentation via the user device of the customer comprises causing presentation via a digital receipt.

19. The method as claim 17 recites, wherein the one or more shared merchant attributes comprise one or more of a similar location; a similar merchant type; a similar good or service offered for sale; or a similar customer base.

20. The method as claim 17 recites, wherein at least one of the first subset or the second subset is based at least in part on a shared merchant attribute of the one or more shared merchant attributes.

* * * * *